US012244076B2

(12) United States Patent
Yun et al.

(10) Patent No.: US 12,244,076 B2
(45) Date of Patent: Mar. 4, 2025

(54) ANTENNA SYSTEM MOUNTED ON VEHICLE

(71) Applicant: LG ELECTRONICS INC., Seoul (KR)

(72) Inventors: Changwon Yun, Seoul (KR); Hanphil Rhyu, Seoul (KR); Kangjae Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 357 days.

(21) Appl. No.: 17/757,008

(22) PCT Filed: Dec. 11, 2019

(86) PCT No.: PCT/KR2019/017462
§ 371 (c)(1),
(2) Date: Jun. 7, 2022

(87) PCT Pub. No.: WO2021/117926
PCT Pub. Date: Jun. 17, 2021

(65) Prior Publication Data
US 2023/0009333 A1    Jan. 12, 2023

(51) Int. Cl.
*H01Q 1/32* (2006.01)
*H01Q 1/38* (2006.01)
(Continued)

(52) U.S. Cl.
CPC ........... *H01Q 5/335* (2015.01); *H01Q 1/3275* (2013.01); *H01Q 1/38* (2013.01); *H01Q 21/061* (2013.01)

(58) Field of Classification Search
CPC .... H01Q 1/1221; H01Q 1/241; H01Q 1/3275; H01Q 1/38; H01Q 1/42; H01Q 13/10;
(Continued)

(56) References Cited

U.S. PATENT DOCUMENTS 10,347,985 B2 * 7/2019 Kim .................. H01Q 1/243
2009/0128418 A1    5/2009 Shih
(Continued)

FOREIGN PATENT DOCUMENTS

JP    2003283239    10/2003
JP    2007150823    6/2007
(Continued)

OTHER PUBLICATIONS

PCT International Application No. PCT/KR2019/017462, International Search Report dated Sep. 10, 2020, 2 pages.
(Continued)

*Primary Examiner* — Thien M Le
(74) *Attorney, Agent, or Firm* — LEE, HONG, DEGERMAN, KANG & WAIMEY

(57) ABSTRACT

An antenna system mounted on a vehicle according to the present invention may comprise: a first circuit board configured to be mountable to a metal frame; a second circuit board disposed so as to be spaced apart a predetermined distance from the first circuit board through a metal supporter; and an antenna configured to emit a signal transmitted from a power supply unit, said signal being transmitted through a space between the first circuit board and the second circuit board.

19 Claims, 25 Drawing Sheets

(51) Int. Cl.
*H01Q 5/335* (2015.01)
*H01Q 21/06* (2006.01)

(58) Field of Classification Search
CPC ...... H01Q 21/061; H01Q 21/28; H01Q 5/335; H01Q 9/0407; H04B 1/40; H04B 7/0413; H04B 7/06
See application file for complete search history.

(56) References Cited

U.S. PATENT DOCUMENTS

| | | | |
|---|---|---|---|
| 2015/0200445 A1 | 7/2015 | Murphy | |
| 2015/0346322 A1* | 12/2015 | Schmalenberg | H01Q 13/206 342/175 |
| 2018/0175484 A1* | 6/2018 | Tsai | H04B 1/3827 |
| 2020/0203802 A1* | 6/2020 | Jeon | H04B 1/40 |
| 2020/0212543 A1* | 7/2020 | Zhu | H01Q 1/44 |
| 2020/0249343 A1* | 8/2020 | Yu | H01Q 21/064 |
| 2021/0274638 A1* | 9/2021 | Liu | H05K 3/0061 |
| 2022/0037753 A1* | 2/2022 | Tang | H01Q 19/10 |
| 2022/0368051 A1* | 11/2022 | Asano | H01R 12/91 |
| 2022/0393411 A1* | 12/2022 | Asano | H01R 24/54 |
| 2024/0243462 A1* | 7/2024 | Kim | H01Q 1/32 |

FOREIGN PATENT DOCUMENTS

| | | |
|---|---|---|
| KR | 10-2016-0084192 | 7/2016 |
| KR | 1020180025066 | 3/2018 |

OTHER PUBLICATIONS

Korean Intellectual Property Office Application No. 10-2022-7011660, Notice of Allowance dated Feb. 3, 2024, 6 pages.

* cited by examiner

SUB PCB extension region (a)

(b)

(a) SW = 1pF (b) SW = 30nH (c) SW = 10nH (d) SW = 5nH

ANTENNA SYSTEM MOUNTED ON VEHICLE

CROSS-REFERENCE TO RELATED APPLICATION(S)

This application is the National Stage filing under 35 U.S.C. 371 of International Application No. PCT/KR2019/017462 filed on Dec. 11, 2019, the contents of which are all incorporated by reference herein in their entirety.

TECHNICAL FIELD

The present disclosure relates to an antenna system mounted on a vehicle. One particular implementation relates to an antenna system having a broadband antenna that is capable of operating in various communication systems, and to a vehicle having the same.

BACKGROUND ART

Electronic devices may be classified into mobile/portable terminals and stationary terminals according to mobility. Also, the electronic devices may be classified into handheld types and vehicle mount types according to whether or not a user can directly carry.

Functions of electronic devices are diversifying. Examples of such functions include data and voice communications, capturing images and video via a camera, recording audio, playing music files via a speaker system, and displaying images and video on a display. Some electronic devices include additional functionality which supports electronic game playing, while other terminals are configured as multimedia players. Specifically, in recent time, mobile terminals can receive broadcast and multicast signals to allow viewing of video or television programs As it becomes multifunctional, an electronic device can be allowed to capture still images or moving images, play music or video files, play games, receive broadcast and the like, so as to be implemented as an integrated multimedia player.

Efforts are ongoing to support and increase the functionality of electronic devices. Such efforts include software and hardware improvements, as well as changes and improvements in the structural components.

In addition to those attempts, the electronic devices provide various services in recent years by virtue of commercialization of wireless communication systems using an LTE communication technology. In the future, it is expected that a wireless communication system using a 5G communication technology will be commercialized to provide various services. Meanwhile, some of LTE frequency bands may be allocated to provide 5G communication services.

In this regard, the mobile terminal may be configured to provide 5G communication services in various frequency bands. Recently, attempts have been made to provide 5G communication services using a Sub-6 band under a 6 GHz band. In the future, it is also expected to provide 5G communication services by using a millimeter-wave (mm-Wave) band in addition to the Sub-6 band for a faster data rate.

Recently, the necessity of providing such a communication service through a vehicle is increasing. Meanwhile, there is a need for a fifth generation (5G) communication service, which is a next generation communication service, as well as existing communication services such as LTE (Long Term Evolution) and the like in relation to communication services.

Accordingly, broadband antennas operating in both the LTE frequency bands and the 5G Sub6 frequency bands need to be disposed in a vehicle other than an electronic device. However, broadband antennas such as cone antennas have problems in that a vertical profile and a weight increase due to an increase in an overall antenna size, particularly, a height.

In addition, the broadband antennas such as the cone antennas may be implemented in a three-dimensional structure compared to related art planar antennas. In addition, multiple-input/multi-output (MIMO) should be implemented in an electronic device or vehicle to improve communication reliability and communication capacity. To this end, it is necessary to arrange a plurality of broadband antennas in the electronic device or vehicle.

This causes a problem that any detailed arrangement structure has not been taught to arrange cone antennas having such a three-dimensional structure in an electronic device or vehicle while maintaining a low interference level among the cone antennas.

In addition, it is necessary to improve antenna performance while maintaining a low profile structure in the three-dimensional antenna system. However, in the three-dimensional antenna system, a mechanical structure for fixing the antenna in a vehicle is required while securing a height of an antenna itself. This may cause a problem that the antenna performance should be improved while maintaining the mechanical structure to be equal to or lower than a predetermined height.

When the antenna system is disposed in the vehicle, a plurality of antennas may be disposed. Among these antennas, antennas operating in a low band (LB) of 600 MHz to 960 MHz have a difficulty in satisfying performance in the corresponding band.

DISCLOSURE OF INVENTION

Technical Problem

The present disclosure is directed to solving the aforementioned problems and other drawbacks. The present disclosure also describes improvement of antenna system while maintaining a height of an antenna system mounted in a vehicle to be lower than or equal to a predetermined level.

The present disclosure further describes a structure for mounting an antenna system, which is capable of operating in a broad band to support various communication systems, in a vehicle.

The present disclosure further describes an antenna configuration that makes use of a space between stacked PCBs as an antenna region.

The present disclosure further describes a slot antenna configuration capable of wide-band operation in a low band LB.

The present disclosure further describes an antenna configuration capable of improving radiation performance while enabling wide-band operation in a mid band MB as well as in the low band LB.

Solution to Problem

To achieve these and other advantages and in accordance with the purpose of the present invention, as embodied and broadly described herein, there is provided an antenna system mounted on a vehicle including: a first circuit board configured to be mountable to a metal frame; a second circuit board disposed so as to be spaced apart a predetermined distance from the first circuit board through metal supporters; and an antenna configured to radiate a signal transmitted from a feed structure, the signal being transmitted through a space between the first circuit board and the second circuit board.

According to an embodiment, the antenna system may further include a feed structure configured to connect between the first circuit board and the second circuit board.

According to an embodiment, the feed structure may include: a first signal pad and a second signal pad spaced a predetermined distance apart from each other in an area on the first circuit board from which a ground area is removed. Meanwhile, the feed structure may further include a metal post connected to at least one of the first signal pad and the second signal pad and vertically formed between the first circuit board and the second circuit board.

According to an embodiment, the second circuit board may include: a Sub PCB where an SDARS antenna is disposed. Meanwhile, the second circuit board may further include an extended PCB disposed on one side or the other side of the Sub PCB, adjacent to the Sub PCB and configured in such a way as to extend the area where the second circuit board is disposed.

According to an embodiment, the metal post of the feed structure vertically formed between the first circuit board and the second circuit board may be connected directly to the extended PCB or spaced apart from the extended PCB so as to feed power to the same by coupling.

According to an embodiment, the metal post of the feed structure may be connected to a feed plate which is vertically spaced apart from the second circuit board. Meanwhile, the feed plate vertically formed between the first circuit board and the second circuit board may be disposed a predetermined distance apart from the extended PCB. Meanwhile, signals from the feed plate may be coupled to the extended PCB.

According to an embodiment, signals from the metal post are radiated through regions corresponding to the feed structure, the extended PCB, the Sub PCB, the metal supporters, and the first PCB. Meanwhile, the antenna may resonate at a first frequency through a first region formed by one of the metal supporters. Also, the antenna may resonate at a second frequency through a second region formed by the other metal supporter.

According to an embodiment, the first circuit board may be disposed so as to be spaced apart a predetermined distance from the metal frame. Meanwhile, a metal plate may be disposed on the front of the Sub PCB of the second circuit board.

According to an embodiment, a second metal plate may be disposed on one side of the Sub PCB of the second circuit board. Meanwhile, a feed plate connected to a feed post may be disposed on the other side of the Sub PCB of the second circuit board, spaced a predetermined distance apart from the Sub PCB. Meanwhile, the metal plate may be configured in such a way as to be connected to a switching unit with a plurality of terminals having different capacitance and inductance values and change the resonant frequency of the antenna.

According to an embodiment, the antenna system may further include a transceiver circuit configured to transmit signals to the antenna through the feed structure. Meanwhile, the transceiver circuit may be disposed on the back of the first circuit board.

According to an embodiment, the first circuit board may be configured such that a plurality of antennas are disposed thereon. In relation to this, the antenna system may further include a first antenna configured to be connected to the first circuit board through a first feed structure, so as to radiate a first signal through a first metal pattern printed on a first dielectric structure and a first slot. Meanwhile, the antenna system may further include a second antenna configured to be connected to the first circuit board through a second feed structure, so as to radiate a second signal through a second metal pattern printed on a second dielectric structure and a second slot.

According to an embodiment, the transceiver circuit may be controlled to radiate a signal through at least one of the antenna, the first antenna, and the second antenna.

According to an embodiment, the first antenna may operate in a first band corresponding to a low band LB and include a first portion and a second portion so as to be connected to one side and one edge of the circuit board. Furthermore, the second antenna may operate in the first band corresponding to the low band LB and include a first portion and a second portion so as to be connected to the other side and one edge of the circuit board.

According to an embodiment, the antenna system may further include a baseband processor that is operably coupled to the transceiver circuit and configured to control the transceiver circuit so as to perform MIMO in the first band corresponding to the low band through a plurality of antennas. Meanwhile, the plurality of antennas may be low-band (LB) antennas comprising the antenna, the first antenna, and the second antenna.

According to an embodiment, the antenna system may further include a third antenna configured to be connected to the circuit board through a third feed structure, so as to radiate a third signal through a third metal pattern printed on a third dielectric structure and a third slot which are disposed on one edge of the circuit board. Furthermore, the antenna system may further include a fourth antenna configured to be connected to the circuit board through a fourth feed structure, so as to radiate a fourth signal through a fourth metal pattern printed on a fourth dielectric structure and a fourth slot which are disposed on another edge of the circuit board.

According to an embodiment, if the quality of the first signal received through the first antenna is lower than a threshold, the baseband processor may perform MIMO through the antenna and the second antenna.

According to an embodiment, if the quality of the second signal received through the second antenna is lower than a threshold, the baseband processor may perform MIMO through the antenna and the first antenna.

According to an embodiment, the baseband processor may perform carrier aggregation CA through the first signal or second signal in the first band received through the first antenna or the second antenna and the third signal in the second band received through the third antenna.

According to an embodiment, if the quality of the first signal or the second signal is lower than a threshold, the baseband processor performs carrier aggregation CA through a signal in the first band received through the antenna and the third signal.

There is provided a vehicle having an antenna system according to another aspect of the present disclosure. The vehicle may include: a first circuit board configured to be mountable to a metal frame; a second circuit board disposed so as to be spaced apart a predetermined distance from the first circuit board through metal supporters; a feed structure configured to connect between the first circuit board and the second circuit board; and an antenna configured to radiate a signal transmitted from a feed structure, the signal being transmitted through a space between the first circuit board and the second circuit board.

According to an embodiment, the vehicle may further include a plurality of antennas disposed on the antenna system, apart from the antenna.

According to an embodiment, the vehicle may further include a transceiver circuit that is controlled to radiate a signal through at least one of the antenna and the plurality of antennas.

According to an embodiment, the vehicle may further include a baseband processor configured to communicate with at least one of an adjacent vehicle, an RSU (road side unit), and a base station through the transceiver circuit.

Advantageous Effects of Invention

Technical advantages of such an antenna system mounted on a vehicle and the vehicle where the antenna system is mounted are as follows.

According to the present disclosure, it is possible to arrange antennas with a low-profile structure through a slot antenna formed in a space between stacked PCBs in the antenna system mounted on the vehicle.

Another advantage of the antenna system mounted on a vehicle according to the present disclosure is that radiation efficiency can be increased while a low-band (LB) antenna is operating in a wide band.

A further advantage of the antenna system mounted on a vehicle according to the present disclosure is that the level of interference between different antennas can be reduced.

According to an implementation, a structure for mounting an antenna system, which can operate in a broad band, in a vehicle can be provided to support various communication systems by implementing a low band (LB) antenna and other antennas in one antenna module.

According to an implementation, the antenna system can be optimized with different antennas in the low band LB and other bands. This can result in arranging the antenna system with optimal configuration and performance in a roof frame of the vehicle.

According to the present disclosure, the antenna system of the vehicle can implement MIMO and diversity operations using a plurality of antennas in specific bands.

Further scope of applicability of the present invention will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

MODE FOR THE INVENTION

Figure 1:
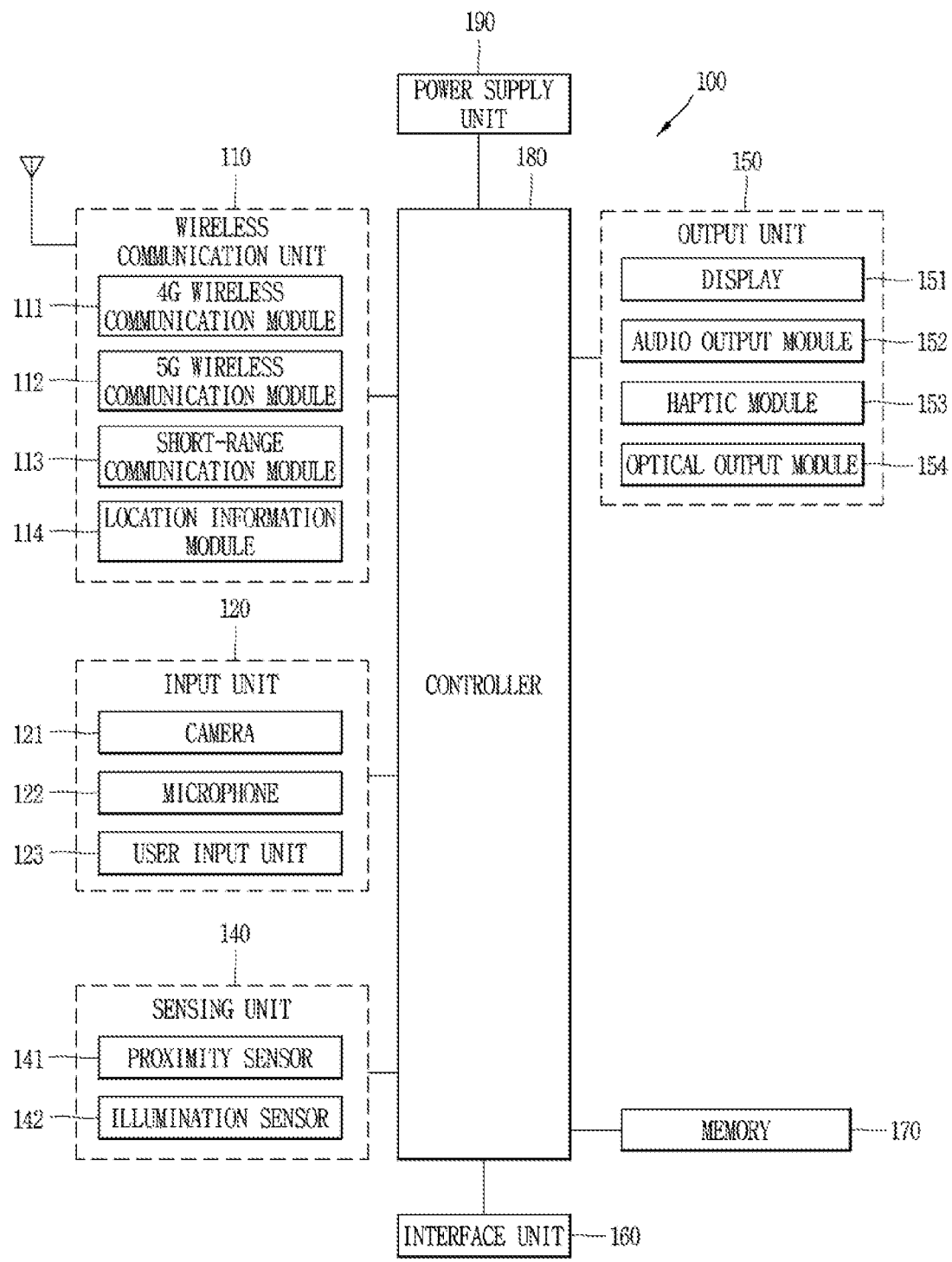
FIG. 1 is a block diagram of an electronic device in accordance with the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signages, and the like.

On the other hand, an antenna system mounted on a vehicle disclosed in this specification mainly refers to an antenna system disposed on an outside of the vehicle, but may also include a mobile terminal (electronic device) belonging to a user aboard the vehicle.

FIG. 1 is a block diagram of an electronic device in accordance with the present disclosure. Here, the electronic device may include a mobile terminal (electronic device) disposed inside the vehicle or carried by a user who is on board the vehicle. Also, a vehicle in which a communication system such as an antenna system is mounted may be referred to as an electronic device.

The electronic device 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components illustrated in FIG. 1 is not a requirement, and that greater or fewer components may alternatively be implemented.

In more detail, among others, the wireless communication unit 110 may typically include one or more modules which permit communications such as wireless communications between the electronic device 100 and a wireless communication system, communications between the electronic device 100 and another electronic device, or communications between the electronic device 100 and an external server. Further, the wireless communication unit 110 may typically include one or more modules which connect the electronic device 100 to one or more networks. Here, the one or more networks may be, for example, a 4G communication network and a 5G communication network.

The wireless communication unit 110 may include at least one of a 4G wireless communication module 111, a 5G wireless communication module 112, a short-range communication module 113, and a location information module 114.

The 4G wireless communication module 111 may perform transmission and reception of 4G signals with a 4G base station through a 4G mobile communication network. In this case, the 4G wireless communication module 111 may transmit at least one 4G transmission signal to the 4G base station. In addition, the 4G wireless communication module 111 may receive at least one 4G reception signal from the 4G base station.

In this regard, Uplink (UL) Multi-input and Multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 112 may perform transmission and reception of 5G signals with a 5G base station through a 5G mobile communication network. Here, the 4G base station and the 5G base station may have a Non-Stand-Alone (NSA) structure. For example, the 4G base station and the 5G base station may be a co-located structure in which the stations are disposed at the same location in a cell. Alternatively, the 5G base station may be disposed in a Stand-Alone (SA) structure at a separate location from the 4G base station.

The 5G wireless communication module 112 may perform transmission and reception of 5G signals with a 5G base station through a 5G mobile communication network. In this case, the 5G wireless communication module 112 may transmit at least one 5G transmission signal to the 5G base station. In addition, the 5G wireless communication module 112 may receive at least one 5G reception signal from the 5G base station.

In this instance, 5G and 4G networks may use the same frequency band, and this may be referred to as LTE re-farming. In some examples, a Sub 6 frequency band, which is a range of 6 GHz or less, may be used as the 5G frequency band.

On the other hand, a millimeter-wave (mmWave) range may be used as the 5G frequency band to perform wideband high-speed communication. When the mmWave band is used, the electronic device 100 may perform beamforming for communication coverage expansion with a base station.

On the other hand, regardless of the 5G frequency band, 5G communication systems can support a larger number of multi-input multi-output (MIMO) to improve a transmission rate. In this instance, UL MIMO may be performed by a plurality of 5G transmission signals transmitted to a 5G base station. In addition, DL MIMO may be performed by a plurality of 5G reception signals received from the 5G base station.

On the other hand, the wireless communication unit 110 may be in a Dual Connectivity (DC) state with the 4G base station and the 5G base station through the 4G wireless communication module 111 and the 5G wireless communication module 112. As such, the dual connectivity with the 4G base station and the 5G base station may be referred to as EUTRAN NR DC (EN-DC). Here, EUTRAN is an abbreviated form of "Evolved Universal Telecommunication Radio Access Network", and refers to a 4G wireless communication system. Also, NR is an abbreviated form of "New Radio" and refers to a 5G wireless communication system.

On the other hand, if the 4G base station and 5G base station are disposed in a co-located structure, throughput improvement can be achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 111 and the 5G wireless communication module 112.

The short-range communication module 113 is configured to facilitate short-range communications. Suitable technologies for implementing such short-range communications include Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the electronic device 100 and a wireless communication system, communications between the electronic device 100 and another electronic device, or communications between the electronic device and a network where another electronic device (or an external server) is located, via wireless area network. One example of the wireless area networks is a wireless personal area network.

Short-range communication between electronic devices may be performed using the 4G wireless communication module 111 and the 5G wireless communication module 112. In one implementation, short-range communication may be performed between electronic devices in a device-to-device (D2D) manner without passing through base stations.

Meanwhile, for transmission rate improvement and communication system convergence, Carrier Aggregation (CA) may be carried out using at least one of the 4G wireless communication module 111 and the 5G wireless communication module 112 and a WiFi communication module. In this regard, 4G+WiFi CA may be performed using the 4G wireless communication module 111 and the Wi-Fi communication module 113. Or, 5G+WiFi CA may be performed using the 5G wireless communication module 112 and the Wi-Fi communication module 113.

The location information module 114 may be generally configured to detect, calculate, derive or otherwise identify a position (or current position) of the electronic device. As an example, the location information module 115 includes a Global Position System (GPS) module, a Wi-Fi module, or both. For example, when the electronic device uses a GPS module, a position of the electronic device may be acquired using a signal sent from a GPS satellite. As another example, when the electronic device uses the Wi-Fi module, a position of the electronic device can be acquired based on information related to a wireless Access Point (AP) which transmits or receives a wireless signal to or from the Wi-Fi module. If desired, the location information module 114 may alternatively or additionally function with any of the other modules of the wireless communication unit 110 to obtain data related to the position of the electronic device. The location information module 114 is a module used for acquiring the position (or the current position) and may not be limited to a module for directly calculating or acquiring the position of the electronic device.

Specifically, when the electronic device utilizes the 5G wireless communication module 112, the position of the electronic device may be acquired based on information related to the 5G base station which performs radio signal transmission or reception with the 5G wireless communication module. In particular, since the 5G base station of the mmWave band is deployed in a small cell having a narrow coverage, it is advantageous to acquire the position of the electronic device.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensor unit 140 may typically be implemented using one or more sensors configured to sense internal information of the electronic device, the surrounding environment of the electronic device, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The electronic device disclosed herein may be configured to utilize information obtained from one or more sensors, and combinations thereof.

The output unit 150 may typically be configured to output various types of information, such as audio, video, tactile output, and the like. The output unit 150 may be shown having at least one of a display 151, an audio output module 152, a haptic module 153, and an optical output module 154. The display 151 may have an inter-layered structure or an integrated structure with a touch sensor in order to implement a touch screen. The touch screen may function as the user input unit 123 which provides an input interface between the electronic device 100 and the user and simultaneously provide an output interface between the electronic device 100 and a user.

The interface unit 160 serves as an interface with various types of external devices that are coupled to the electronic device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the electronic device 100 may perform assorted control functions associated with a connected external device, in response to the external device being connected to the interface unit 160.

The memory 170 is typically implemented to store data to support various functions or features of the electronic device 100. For instance, the memory 170 may be configured to store application programs executed in the electronic device 100, data or instructions for operations of the electronic device 100, and the like. Some of these application programs may be downloaded from an external server via wireless communication. Other application programs may be installed within the electronic device 100 at the time of manufacturing or shipping, which is typically the case for basic functions of the electronic device 100 (for example, receiving a call, placing a call, receiving a message, sending a message, and the like). It is common for application programs to be stored in the memory 170, installed in the electronic device 100, and executed by the controller 180 to perform an operation (or function) for the electronic device 100.

The controller 180 typically functions to control an overall operation of the electronic device 100, in addition to the operations associated with the application programs. The control unit 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1, to execute an application program that have been stored in the memory 170. In addition, the controller 180 may control a combination of at least two of those components included in the electronic device 100 to activate the application program.

The power supply unit 190 may be configured to receive external power or provide internal power in order to supply appropriate power required for operating elements and components included in the electronic device 100. The power supply unit 190 may include a battery, and the battery may be configured to be embedded in the terminal body, or configured to be detachable from the terminal body.

At least part of the components may cooperably operate to implement an operation, a control or a control method of an electronic device according to various implementations disclosed herein. Also, the operation, the control or the control method of the electronic device may be implemented on the electronic device by an activation of at least one application program stored in the memory 170.

Figure 2A:
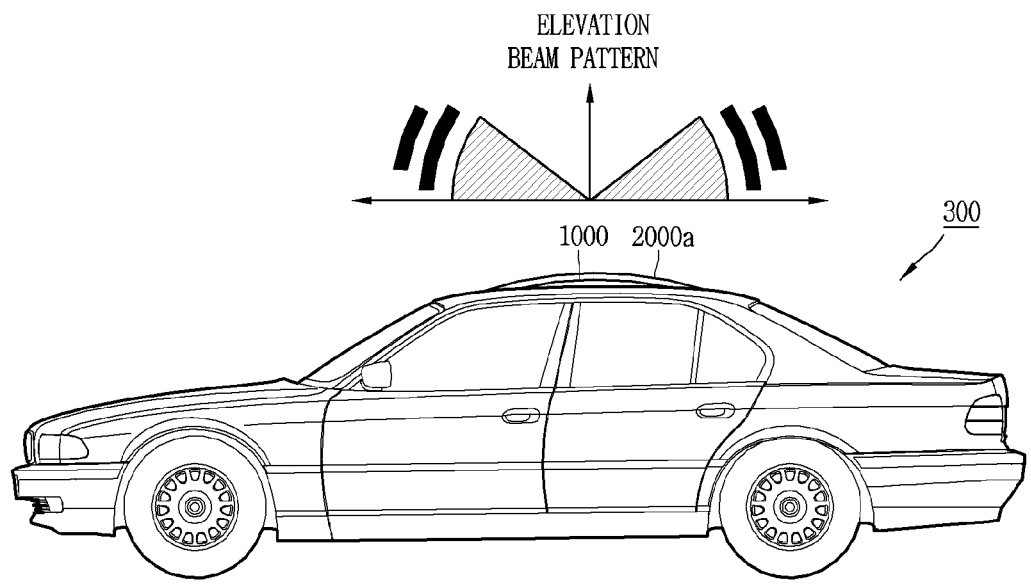
FIGS. 2A to 2C are views illustrating an example of a structure for mounting an antenna system on a vehicle, which includes the antenna system mounted on the vehicle.
Figure 2B:
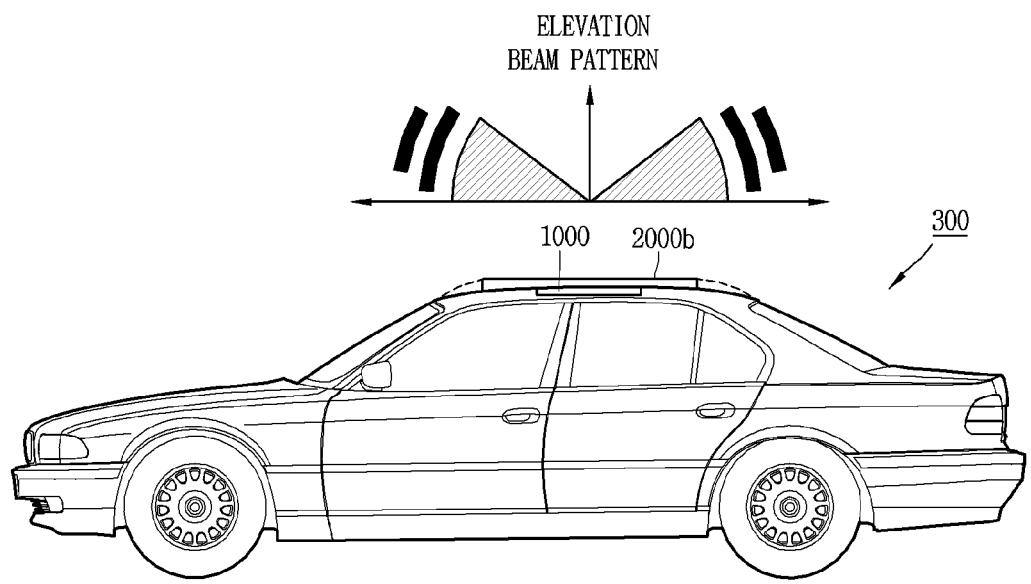
Figure 2C:
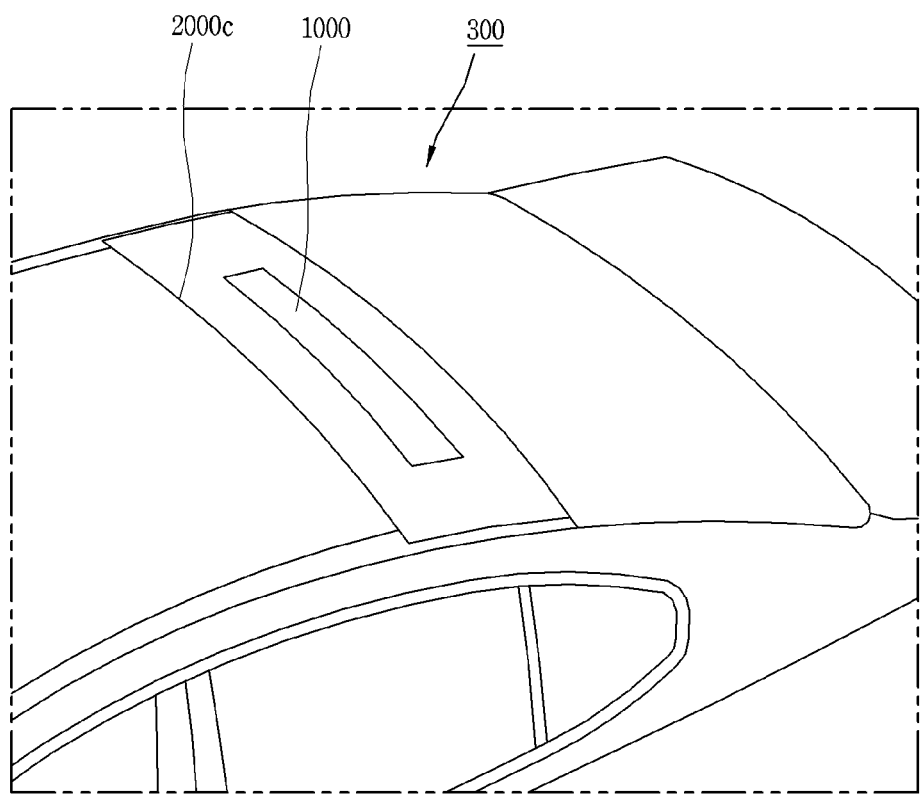

FIGS. 2A to 2C are views illustrating an example of a structure for mounting an antenna system on a vehicle, which includes the antenna system mounted on the vehicle. In this regard, FIGS. 2A and 2B illustrate a configuration in which an antenna system 1000 is mounted on or in a roof of a vehicle. Meanwhile, FIG. 2C illustrates a structure in which the antenna system 1000 is mounted on a roof of the vehicle and a roof frame of a rear mirror.

Referring to FIGS. 2A to 2C, in order to improve the appearance of the vehicle and to maintain a telematics performance at the time of collision, an existing shark fin antenna is replaced with a flat antenna of a non-protruding shape. In addition, the present disclosure proposes an integrated antenna of an LTE antenna and a 5G antenna considering fifth generation (5G) communication while providing the existing mobile communication service (e.g., LTE).

Referring to FIG. 2A, the antenna system 1000 may be disposed on the roof of the vehicle. In FIG. 2A, a radome 2000*a* for protecting the antenna system 1000 from an external environment and external impacts while the vehicle travels may cover the antenna system 1000. The radome 2000*a* may be made of a dielectric material through which radio signals are transmitted/received between the antenna system 1000 and a base station.

Referring to 2B, the antenna system 1000 may be disposed within a roof structure 2000*b* of the vehicle, and at least part of the roof structure 2000*b* may be made of a non-metallic material. At this time, the at least part of the roof structure 2000*b* of the vehicle may be realized as the non-metallic material, and may be made of a dielectric material through which radio signals are transmitted/received between the antenna system 1000 and the base station.

Also, referring to 2C, the antenna system 1000 may be disposed within a roof frame 2000*c* of the vehicle, and at least part of the roof frame 200*c* may be made of a non-metallic material. At this time, the at least part of the roof frame 2000*c* of the vehicle may be realized as the non-metallic material, and may be made of a dielectric material through which radio signals are transmitted/received between the antenna system 1000 and the base station.

Figure 3:
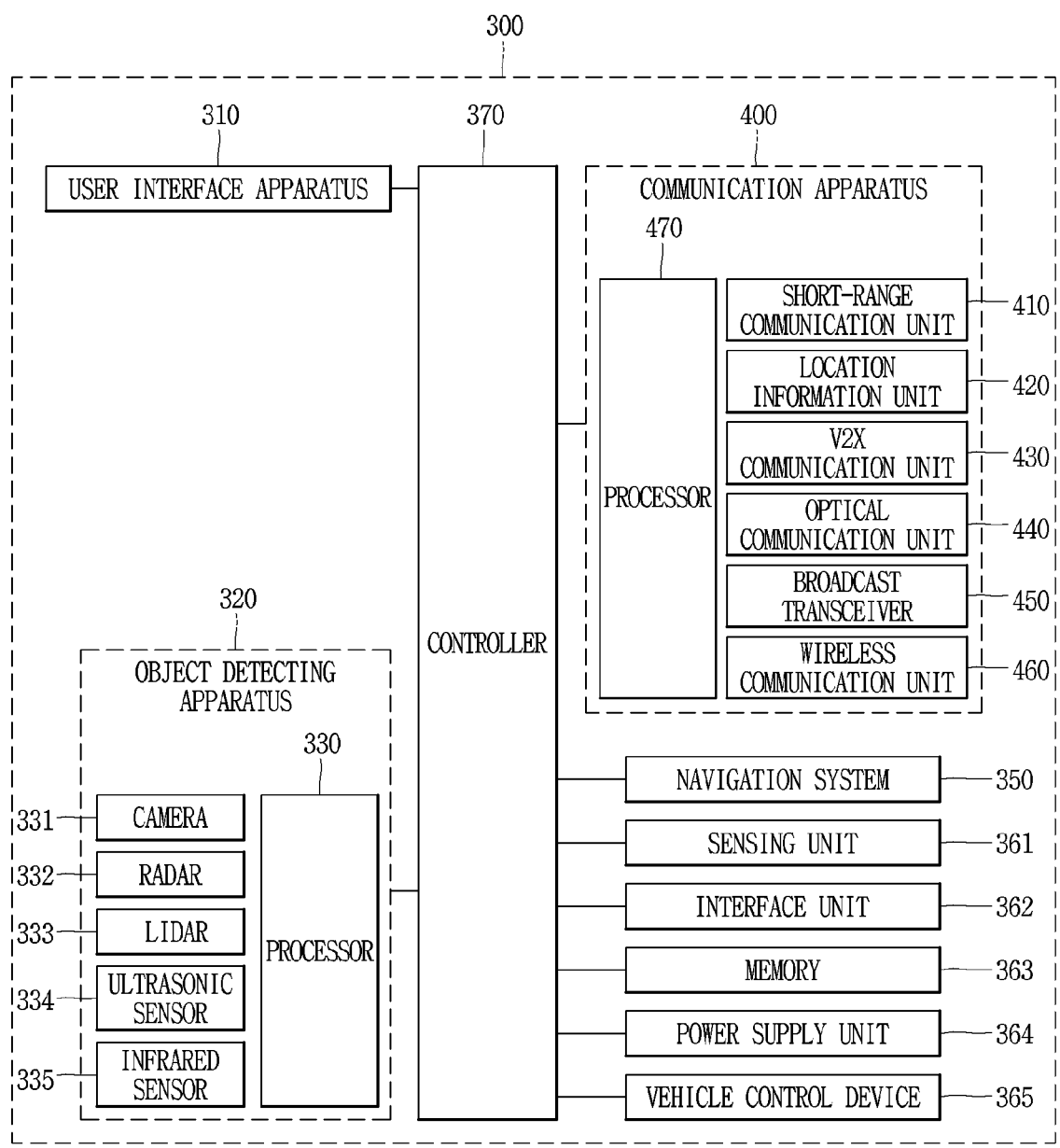
FIG. 3 is a block diagram illustrating a vehicle in accordance with an implementation.

Meanwhile, the antenna system 1000 may be installed on a front or rear surface of the vehicle depending on applications, other than the roof structure or roof frame of the vehicle. FIG. 3 is a block diagram illustrating a vehicle in accordance with an implementation of the present disclosure.

As illustrated in FIG. 2A to 3, a vehicle 300 may include wheels turning by a driving force, and a steering apparatus for adjusting a driving (ongoing, moving) direction of the vehicle 300.

The vehicle 300 may be an autonomous vehicle. The vehicle 300 may be switched into an autonomous (driving) mode or a manual (driving) mode based on a user input. For example, the vehicle 300 may be switched from the manual mode into the autonomous mode or from the autonomous mode into the manual mode based on a user input received through a user interface apparatus 310.

The vehicle 300 may be switched into the autonomous mode or the manual mode based on driving environment information. The driving environment information may be generated based on object information provided from the object detecting apparatus. For example, the vehicle 300 may be switched from the manual mode into the autonomous mode or from the autonomous mode into the manual mode based on driving environment information generated in the object detecting apparatus.

In an example, the vehicle 300 may be switched from the manual mode into the autonomous mode or from the autonomous mode into the manual mode based on driving environment information received through a communication apparatus 400. The vehicle 300 may be switched from the manual mode into the autonomous mode or from the autonomous mode into the manual mode based on information, data or signal provided from an external device.

When the vehicle 300 is driven in the autonomous mode, the autonomous vehicle 300 may be driven based on an operation system. For example, the autonomous vehicle 300 may be driven based on information, data or signal generated in a driving system, a parking exit system, and a parking system.

When the vehicle 300 is driven in the manual mode, the autonomous vehicle 300 may receive a user input for driving through a driving control apparatus. The vehicle 300 may be driven based on the user input received through the driving control apparatus.

An overall length refers to a length from a front end to a rear end of the vehicle 300, a width refers to a width of the vehicle 300, and a height refers to a length from a bottom of a wheel to a roof. In the following description, an overall-length direction L may refer to a direction which is a criterion for measuring the overall length of the vehicle 300, a width direction W may refer to a direction that is a criterion for measuring a width of the vehicle 300, and a height direction H may refer to a direction that is a criterion for measuring a height of the vehicle 300.

As illustrated in FIG. 2, the vehicle 300 may include a user interface apparatus 310, an object detecting apparatus, a navigation system 350, and a communication device 400. In addition, the vehicle may further include a sensing unit 361, an interface unit 362, a memory 363, a power supply unit 364, and a vehicle control device 365 in addition to the aforementioned apparatuses and devices. Here, the sensing unit 361, the interface unit 362, the memory 363, the power supply unit 364, and the vehicle control device 365 may have low direct relevance to wireless communication through the antenna system 1000 according to the present disclosure. So, a detailed description thereof will be omitted herein.

According to implementations, the vehicle 300 may include more components in addition to components to be explained in this specification or may not include some of those components to be explained in this specification.

The user interface apparatus 310 may be an apparatus for communication between the vehicle 300 and a user. The user interface apparatus 310 may receive a user input and provide information generated in the vehicle 300 to the user. The vehicle 310 may implement user interfaces (UIs) or user experiences (UXs) through the user interface apparatus 200.

The object detecting apparatus may be an apparatus for detecting an object located at outside of the vehicle 300. The object may be a variety of objects associated with driving (operation) of the vehicle 300. In some examples, objects may be classified into moving objects and fixed (stationary) objects. For example, the moving objects may include other vehicles and pedestrians. The fixed objects may include traffic signals, roads, and structures, for example.

The object detecting apparatus may include a camera 321, a radar 322, a LiDAR 323, an ultrasonic sensor 324, an infrared sensor 325, and a processor 330.

In some implementations, the object detecting apparatus may further include other components in addition to the components described, or may not include some of the components described.

The processor 330 may control an overall operation of each unit of the object detecting apparatus. The processor 330 may detect an object based on an acquired image, and track the object. The processor 330 may execute operations, such as a calculation of a distance from the object, a calculation of a relative speed with the object and the like, through an image processing algorithm.

The processor 330 may detect an object based on a reflected electromagnetic wave which an emitted electromagnetic wave is reflected from the object, and track the object. The processor 330 may execute operations, such as a calculation of a distance from the object, a calculation of a relative speed with the object and the like, based on the electromagnetic wave.

The processor 330 may detect an object based on a reflected laser beam which an emitted laser beam is reflected from the object, and track the object. The processor 330 may execute operations, such as a calculation of a distance from the object, a calculation of a relative speed with the object and the like, based on the laser beam.

The processor 330 may detect an object based on a reflected ultrasonic wave which an emitted ultrasonic wave is reflected from the object, and track the object. The processor 330 may execute operations, such as a calculation of a distance from the object, a calculation of a relative speed with the object and the like, based on the ultrasonic wave.

The processor 330 may detect an object based on reflected infrared light which emitted infrared light is reflected from the object, and track the object. The processor 330 may execute operations, such as a calculation of a distance from the object, a calculation of a relative speed with the object and the like, based on the infrared light.

In some implementations, the object detecting apparatus may include a plurality of processors 330 or may not include any processor 330. For example, each of the camera 321, the radar 322, the LiDAR 323, the ultrasonic sensor 324 and the infrared sensor 325 may include the processor in an individual manner.

When the processor 330 is not included in the object detecting apparatus, the object detecting apparatus may operate according to the control of a processor of an apparatus within the vehicle 300 or the controller 370.

The navigation system 350 may provide location information related to the vehicle based on information obtained through the communication apparatus 400, in particular, a location information unit 420. Also, the navigation system 350 may provide a path (or route) guidance service to a destination based on current location information related to the vehicle. In addition, the navigation system 350 may provide guidance information related to surroundings of the vehicle based on information obtained through the object detecting apparatus and/or a V2X communication unit 430. In some examples, guidance information, autonomous driving service, etc. may be provided based on V2V, V2I, and V2X information obtained through a wireless communication unit operating together with the antenna system 1000.

The object detecting apparatus may operate according to the control of a controller 370.

The communication apparatus 400 may be an apparatus for performing communication with an external device. Here, the external device may be another vehicle, a mobile terminal, or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a 4G wireless communication module 450, and a processor 470.

According to an implementation, the communication apparatus 400 may further include other components in addition to the components described, or may not include some of the components described.

The short-range communication unit 410 is a unit for facilitating short-range communications. Suitable technologies for implementing such short-range communications may include Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range wireless area networks to perform short-range communication between the vehicle 300 and at least one external device.

The location information unit 420 may be a unit for acquiring location information related to the vehicle 300. For example, the location information unit 420 may include a Global Positioning System (GPS) module or a Differential Global Positioning System (DGPS) module.

The V2X communication unit 430 may be a unit for performing wireless communication with a server (Vehicle to Infrastructure; V2I), another vehicle (Vehicle to Vehicle; V2V), or a pedestrian (Vehicle to Pedestrian; V2P). The V2X communication unit 430 may include an RF circuit implementing communication protocols such as V2I, V2V, and V2P.

The optical communication unit 440 may be a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

In some implementations, the light-emitting diode may be integrated with lamps provided on the vehicle 300.

The broadcast transceiver 450 may be a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal, and a data broadcast signal.

The wireless communication unit 460 is a unit that performs wireless communications with one or more communication systems through one or more antenna systems. The wireless communication unit 460 may transmit and/or receive a signal to and/or from a device in a first communication system through a first antenna system. In addition, the wireless communication unit 460 may transmit and/or receive a signal to and/or from a device in a second communication system through a second antenna system. For example, the first communication system and the second communication system may be an LTE communication system and a 5G communication system, respectively. However, the first communication system and the second communication system may not be limited thereto, and may be changed according to applications.

According to the present disclosure, the antenna system 1000 operating in the first and second communication systems may be disposed on the roof, in the roof or in the roof frame of the vehicle 300 according to one of FIGS. 2A to 2C. Meanwhile, the wireless communication unit 460 of FIG. 3 may operate in both the first and second communication systems, and may be combined with the antenna system 1000 to provide multiple communication services to the vehicle 300.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 300 or the controller 370.

Meanwhile, the communication apparatus 400 may implement a display apparatus for a vehicle together with the user interface apparatus 310. In this instance, the display apparatus for the vehicle may be referred to as a telematics apparatus or an Audio Video Navigation (AVN) apparatus.

The communication apparatus 400 may operate according to the control of the controller 370.

At least one processor and the controller 370 included in the vehicle 300 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

The vehicle 300 related to the present disclosure can operate in any one of a manual driving mode and an autonomous driving mode. That is, the driving modes of the vehicle 300 may include the manual driving mode and the autonomous driving mode.

Hereinafter, description will be given of implementations of a multi-transceiving system structure and an electronic device or vehicle having the same with reference to the accompanying drawings. Specifically, implementations related to a broadband antenna operating in a heterogeneous radio system, and an electronic device and a vehicle having the same will be described. It will be apparent to those skilled in the art that the present disclosure may be embodied in other specific forms without departing from the idea or essential characteristics thereof.

Figure 4:
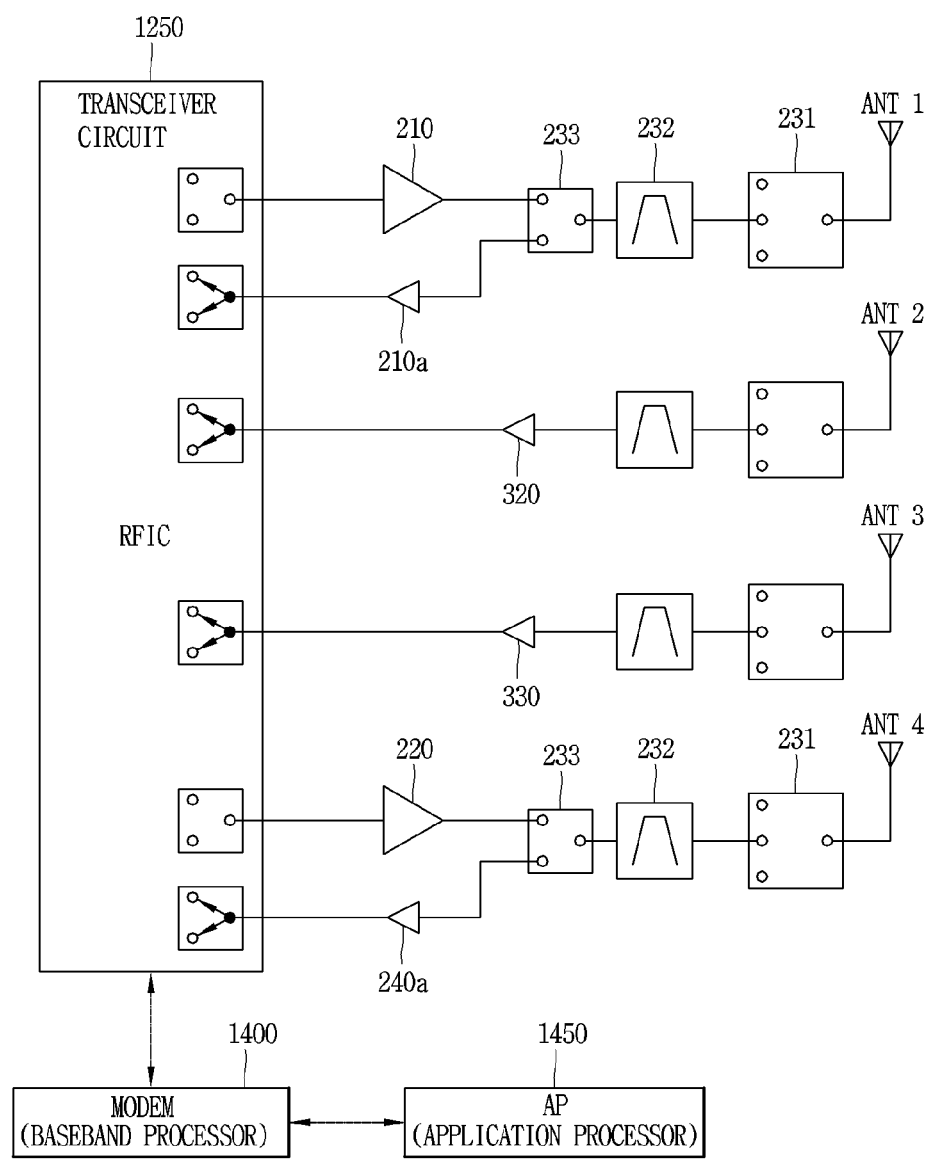
FIG. 4 is a block diagram illustrating a configuration of a wireless communication unit of an electronic device or vehicle operable in a plurality of wireless communication systems according to the present disclosure.

FIG. 4 is a block diagram illustrating a configuration of a wireless communication unit of an electronic device or vehicle operable in a plurality of wireless communication systems according to the present disclosure. Referring to FIG. 4, the electronic device or the vehicle may include a first power amplifier 210, a second power amplifier 220, and an RFIC 1250. In addition, the electronic device or the vehicle may further include a modem 1400 and an application processor (AP) 1450. Here, the modem 1400 and the application processor (AP) 1450 may be physically implemented on a single chip, and may be implemented in a logically and functionally separated form. However, the present disclosure may not be limited thereto and may be implemented in the form of a chip that is physically separated according to an application.

Meanwhile, the electronic device or the vehicle may include a plurality of low noise amplifiers (LNAs) 210a to 240a in the receiver. Here, the first power amplifier 210, the second power amplifier 220, the RFIC 1250, and the plurality of low noise amplifiers 210a to 240a may all be operable in the first communication system and the second communication system. In this case, the first communication system and the second communication system may be a 4G communication system and a 5G communication system, respectively.

As illustrated in FIG. 4, the RFIC 1250 may be configured as a 4G/5G integrated type, but the present disclosure may not be limited thereto. The RFIC 250 may be configured as a 4G/5G separate type according to an application. When the RFIC 1250 is configured as the 4G/5G integrated type, it may be advantageous in terms of synchronization between 4G and 5G circuits, and simplification of control signaling by the modem 1400.

On the other hand, when the RFIC 1250 is configured as the 4G/5G separate type, it may be referred to as a 4G RFIC and a 5G RFIC, respectively. In particular, when there is a great band difference between the 5G band and the 4G band, such as when the 5G band is configured as a millimeter wave band, the RFIC 1250 may be configured as a 4G/5G separated type. As such, when the RFIC 1250 is configured as the 4G/5G separate type, there may be an advantage that the RF characteristics can be optimized for each of the 4G band and the 5G band.

Meanwhile, even when the RFIC 1250 is configured as the 4G/5G separate type, the 4G RFIC and the 5G RFIC may be logically and functionally separated but physically implemented in one chip.

On the other hand, the application processor (AP) 1450 may be configured to control the operation of each component of the electronic device. Specifically, the application processor (AP) 1450 may control the operation of each component of the electronic device through the modem 1400.

For example, the modem 1400 may be controlled through a power management IC (PMIC) for low power operation of the electronic device. Accordingly, the modem 1400 may operate power circuits of a transmitter and a receiver through the RFIC 1250 in a low power mode.

In this regard, when the electronic device is determined to be in an idle mode, the application processor (AP) 1450 may control the RFIC 1250 through the modem 400 as follows. For example, when the electronic device is in an idle mode, the application processor 1450 may control the RFIC 1250 through the modem 1400, such that at least one of the first and second power amplifiers 210 and 220 operates in a low power mode or is turned off.

According to another implementation, the application processor (AP) 1450 may control the modem 1400 to enable wireless communication capable of performing low power communication when the electronic device is in a low battery mode. For example, when the electronic device is connected to a plurality of entities among a 4G base station, a 5G base station, and an access point, the application processor (AP) 1450 may control the modem 1400 to enable wireless communication at the lowest power. Accordingly, even though a throughput is slightly sacrificed, the application processor (AP) 1450 may control the modem 1400 and the RFIC 1250 to perform short-range communication using only the short-range communication module 113.

According to another implementation, when a remaining battery capacity of the electronic device is equal to or greater than a threshold value, the application processor 1450 may control the modem 1400 to select an optimal wireless interface. For example, the application processor (AP) 1450 may control the modem 1400 to receive data through both the 4G base station and the 5G base station according to the remaining battery capacity and the available radio resource information. In this case, the application processor (AP) 1450 may receive the remaining battery capacity information from the PMIC and the available radio resource information from the modem 1400. Accordingly, when the remaining battery capacity and the available radio resources are sufficient, the application processor (AP) 1450 may control the modem 1400 and the RFIC 1250 to receive data through both the 4G base station and 5G base station.

Meanwhile, in a multi-transceiving system of FIG. 4, a transmitter and a receiver of each radio system may be integrated into a single transceiver. Accordingly, a circuit portion for integrating two types of system signals may be removed from an RF front-end.

Furthermore, since the front end parts can be controlled by an integrated transceiver, the front end parts may be more efficiently integrated than when the transceiving system is separated by communication systems.

In addition, upon the separation for each communication system, the control of other communication systems according to necessity is impossible and thereby system delay extends. This makes it impossible to allocate resources efficiently. On the other hand, in the multi-transceiving system as illustrated in FIG. 2, different communication systems can be controlled as needed, system delay can be minimized, and resources can be efficiently allocated.

Meanwhile, the first power amplifier 210 and the second power amplifier 220 may operate in at least one of the first and second communication systems. In this regard, when the 5G communication system operates in a 4G band or a Sub 6 band, the first and second power amplifiers 1210 and 220 can operate in both the first and second communication systems.

On the other hand, when the 5G communication system operates in a millimeter wave (mmWave) band, one of the first and second power amplifiers 210 and 220 may operate in the 4G band and the other in the millimeter-wave band.

On the other hand, two different wireless communication systems may be implemented in one antenna by integrating a transceiver and a receiver to implement a two-way antenna. In this case, 4×4 MIMO may be implemented using four antennas as illustrated in FIG. 2. At this time, 4×4 DL MIMO may be performed through downlink (DL).

Meanwhile, when the 5G band is a Sub 6 band, first to fourth antennas ANT1 to ANT4 may be configured to operate in both the 4G band and the 5G band. On the contrary, when the 5G band is a millimeter wave (mmWave) band, the first to fourth antennas ANT1 to ANT4 may be configured to operate in one of the 4G band and the 5G band. In this case, when the 5G band is the millimeter wave (mmWave) band, each of the plurality of antennas may be configured as an array antenna in the millimeter wave band.

Meanwhile, 2×2 MIMO may be implemented using two antennas connected to the first power amplifier 210 and the second power amplifier 220 among the four antennas. At this time, 2×2 UL MIMO (2 Tx) may be performed through uplink (UL). Alternatively, the present disclosure is not limited to 2×2 UL MIMO, and may also be implemented as 1 Tx or 4 Tx. In this case, when the 5G communication system is implemented by 1 Tx, only one of the first and second power amplifiers 210 and 220 need to operate in the 5G band. Meanwhile, when the 5G communication system is implemented by 4 Tx, an additional power amplifier operating in the 5G band may be further provided. Alternatively, a transmission signal may be branched in each of one or two transmission paths, and the branched transmission signal may be connected to a plurality of antennas.

On the other hand, a switch-type splitter or power divider is embedded in RFIC corresponding to the RFIC 1250. Accordingly, a separate component does not need to be placed outside, thereby improving component mounting performance. In detail, a transmitter (TX) of two different communication systems can be selected by using a single pole double throw (SPDT) type switch provided in the RFIC corresponding to the controller.

In addition, the electronic device or the vehicle capable of operating in a plurality of wireless communication systems according to an implementation may further include a duplexer 231, a filter 232, and a switch 233.

The duplexer 231 may be configured to separate a signal in a transmission band and a signal in a reception band from each other. In this case, the signal in the transmission band transmitted through the first and second power amplifiers 210 and 220 may be applied to the antennas ANT1 and ANT4 through a first output port of the duplexer 231. On the contrary, the signal in the reception band received through the antennas ANT1 and ANT4 may be received by the low noise amplifiers 310 and 340 through a second output port of the duplexer 231.

The filter 232 may be configured to pass a signal in a transmission band or a reception band and to block a signal in a remaining band. In this case, the filter 232 may include a transmission filter connected to the first output port of the duplexer 231 and a reception filter connected to the second output port of the duplexer 231. Alternatively, the filter 232 may be configured to pass only the signal in the transmission band or only the signal in the reception band according to a control signal.

The switch 233 may be configured to transmit only one of a transmission signal and a reception signal. In an implementation of the present disclosure, the switch 233 may be configured in a single-pole double-throw (SPDT) form to separate the transmission signal and the reception signal in a time division duplex (TDD) scheme. In this case, the transmission signal and the reception signal may be in the same frequency band, and thus the duplexer 231 may be implemented in a form of a circulator.

Meanwhile, in another implementation of the present disclosure, the switch 233 may also be applied to a frequency division multiplex (FDD) scheme. In this case, the switch 233 may be configured in the form of a double-pole double-throw (DPDT) to connect or block a transmission signal and a reception signal, respectively. On the other hand, since the transmission signal and the reception signal can be separated by the duplexer 231, the switch 233 may not be necessarily required.

Meanwhile, the electronic device or the vehicle according to the present disclosure may further include a modem 1400 corresponding to the controller. In this case, the RFIC 1250 and the modem 1400 may be referred to as a first controller (or a first processor) and a second controller (a second processor), respectively. On the other hand, the RFIC 1250 and the modem 1400 may be implemented as physically separated circuits. Alternatively, the RFIC 1250 and the modem 1400 may be logically or functionally distinguished from each other on one physical circuit.

The modem 1400 may perform controlling of signal transmission and reception and processing of signals through different communication systems using the RFID 1250. The modem 1400 may acquire control information from a 4G base station and/or a 5G base station. Here, the control information may be received through a physical downlink control channel (PDCCH), but may not be limited thereto.

The modem 1400 may control the RFIC 1250 to transmit and/or receive signals through the first communication system and/or the second communication system for a specific time interval and from frequency resources. Accordingly, the RFIC 1250 may control transmission circuits including the first and second power amplifiers 210 and 220 to transmit a 4G signal or a 5G signal in the specific time interval. In addition, the RFIC 1250 may control reception circuits including the first to fourth low noise amplifiers 210a to 240a to receive a 4G signal or a 5G signal in the specific time interval.

Figure 5A:
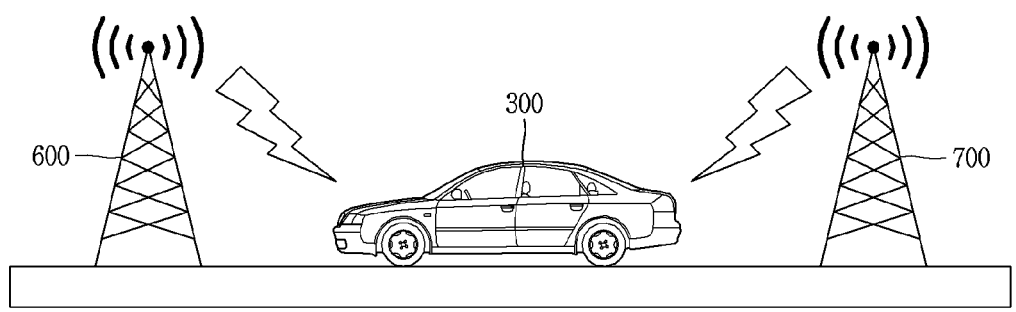
FIG. 5A is a conceptual diagram of a vehicle according to an example configured to perform communication with a base station.
Figure 5B:
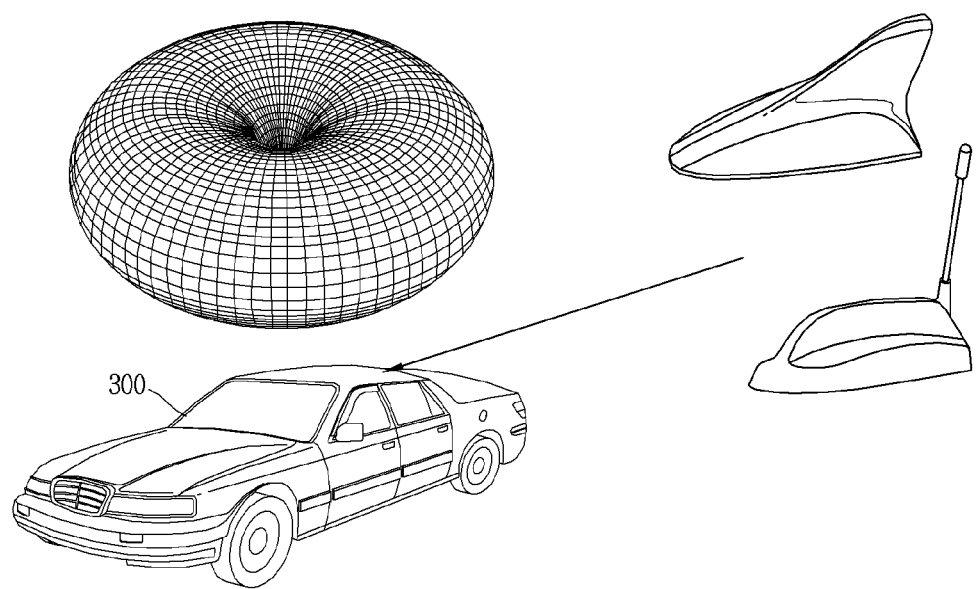
FIG. 5B shows an antenna mountable on a vehicle according to an example and an antenna radiation pattern.

Meanwhile, an antenna system with a plurality of antennas mounted on a vehicle and a vehicle having the same, as illustrated in FIGS. 2A to FIG. 4, will be described below. In relation to this, FIG. 5A is a conceptual diagram of a vehicle according to an example configured to perform communication with a base station. FIG. 5B shows an antenna mountable on a vehicle according to an example and an antenna radiation pattern.

Referring to FIG. 5B, a vehicle 300 on a road may perform wireless communication with different base stations 600 and 700. In relation to this, the different base stations 600 and 700 may be base stations that perform 4G/5G wireless communication. Specifically, the vehicle 300 may perform wireless communication by performing handover between the first base station 600 and the second base station 700. Alternatively, the vehicle 300 may be in a dual connectivity in which it stays connected to both the first base station 600 and the second base station 700. In this case, either the first base station 600 or the second base station 600 may be a base station of a first communication system, and the other one may be a base station of a second communication system.

Moreover, referring to FIG. 5B, the vehicle 300 may call for antenna characteristics of an omnidirectional radiation pattern, for communication with GSM/LTE/5G base stations. In relation to this, the antennas currently mounted on the vehicle may be monopole antennas employed in an external shark antenna module. The shark antenna module may protrude into the vehicle. Also, the external shark antenna module has a lack of space for a plurality of antennas to perform multiple-input and multiple-output (MIMO) while covering a broadband for a plurality of communication systems.

To solve this problem, the antenna system according to the present disclosure needs to be designed to have a plurality of antennas to perform MIMO while minimizing the outward protruding height.

Meanwhile, the antenna system for a vehicle according to the present disclosure has the following requirements:

Vehicle antenna requirements: A mean gain of −2 dB at low elevations of 70 to 90 degrees. That is, the mean gain for nearly horizontal radiation functionality corresponding to low elevation is −2 dB.

Limitations in the related art: Antenna technologies using a space within a module can hardly meet the antenna performance requirements because of performance deterioration due to low antenna height.

Necessity of the present disclosure: There is a need for an antenna structure for improving antenna performance without an additional increase in height for guaranteeing antenna performance.

In relation to this, there are low-band (LB) antenna issues as follows. In a vehicle-on-ground environment and a design space with an antenna height of 17 mm or less, a beam peak is formed vertically, making it difficult to meet the low elevation performance. In relation to this, a shark antenna with low elevation characteristics at 1 GHz or below may be located on an outer part of the vehicle. On the other hand, a vehicle antenna to be implemented in the present disclosure needs to be implemented to have a small height of 17 mm or less.

To this end, another requirement may be needed to mount shark antennas within the vehicle, which are originally exposed to the exterior for the design of the vehicle. Thus, there is a need for a technique of designing an antenna that has an omnidirectional radiation pattern while maintaining a low profile from a structural point of view. Accordingly, the present disclosure proposes a slot antenna configuration with a low-profile structure and a Sub PCB structure.

Figure 6:
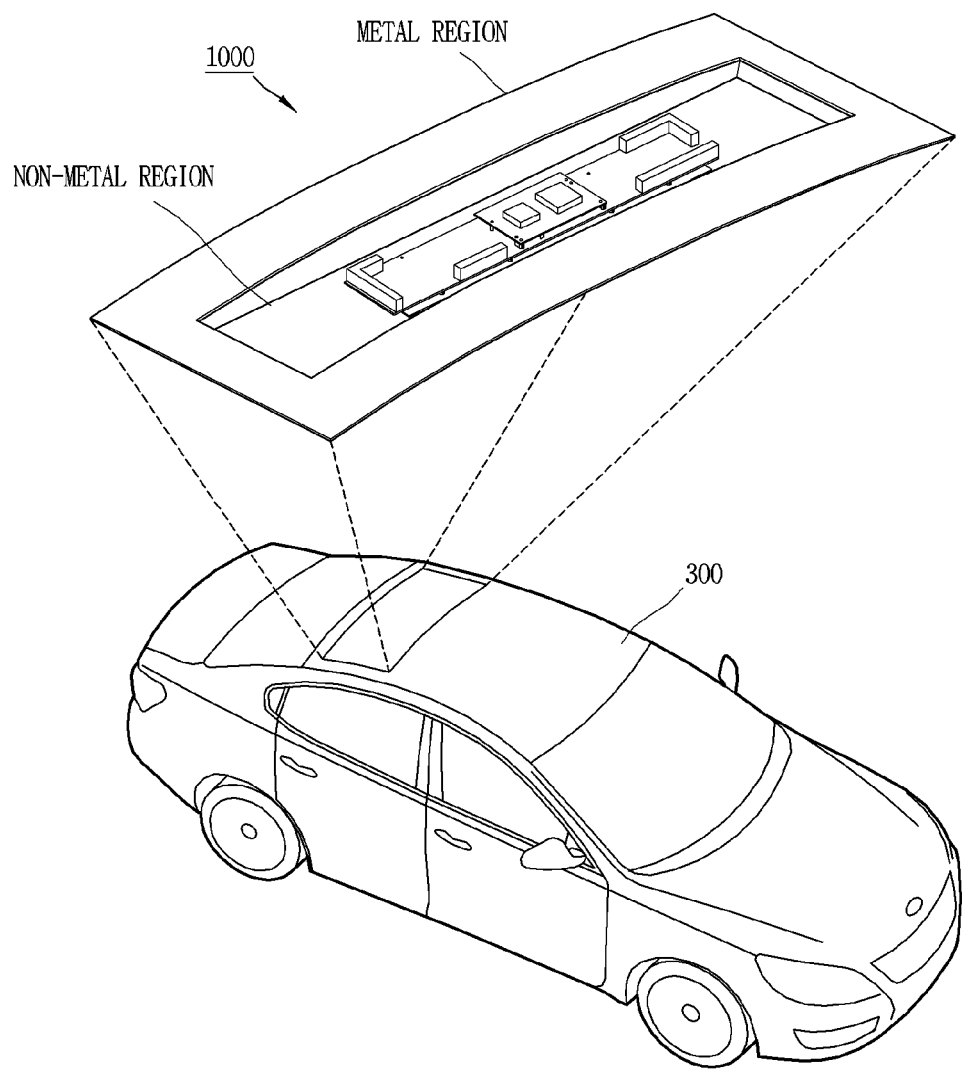
FIG. 6 shows an antenna system that can be mounted inside a roof frame of a vehicle according to an embodiment.
Figure 7A:
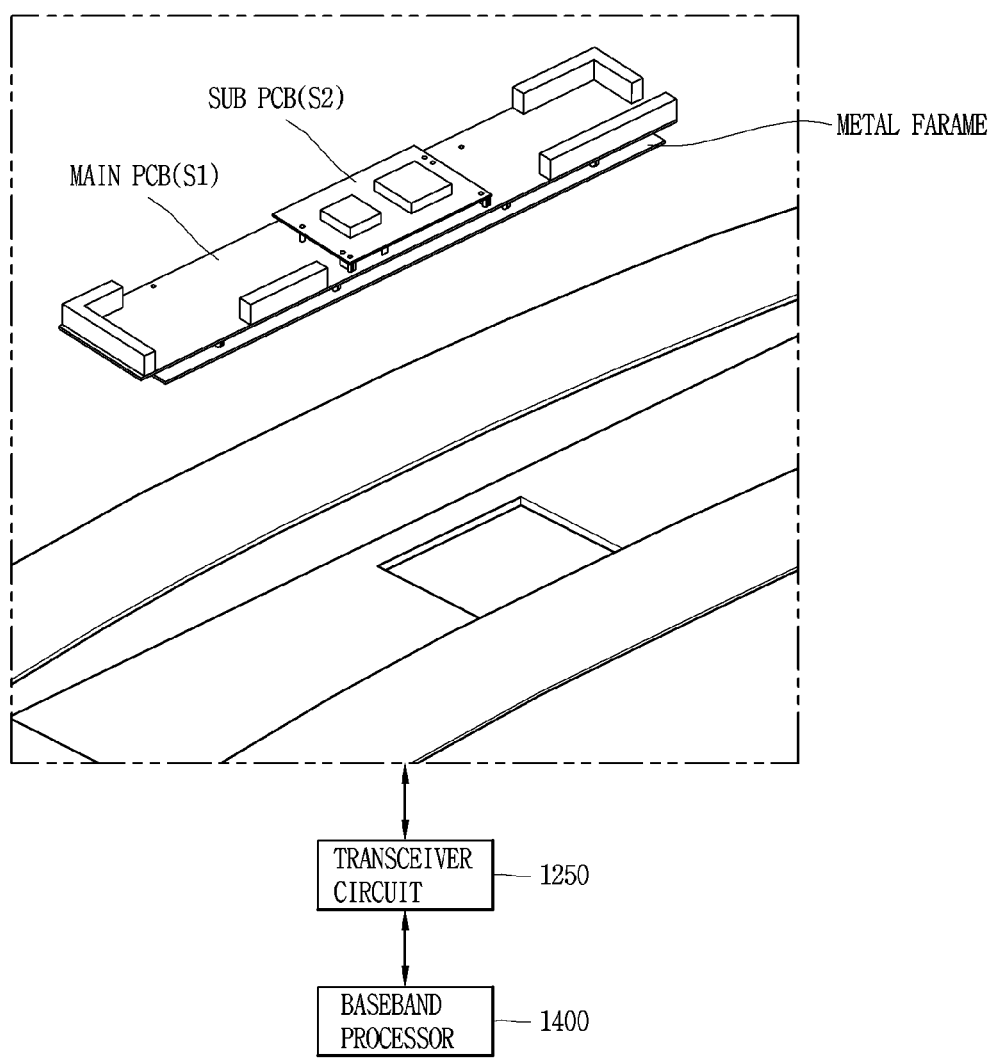
FIG. 7A shows a plurality of antennas that can be disposed in an antenna system according to an embodiment and a configuration for controlling them.
Figure 7B:
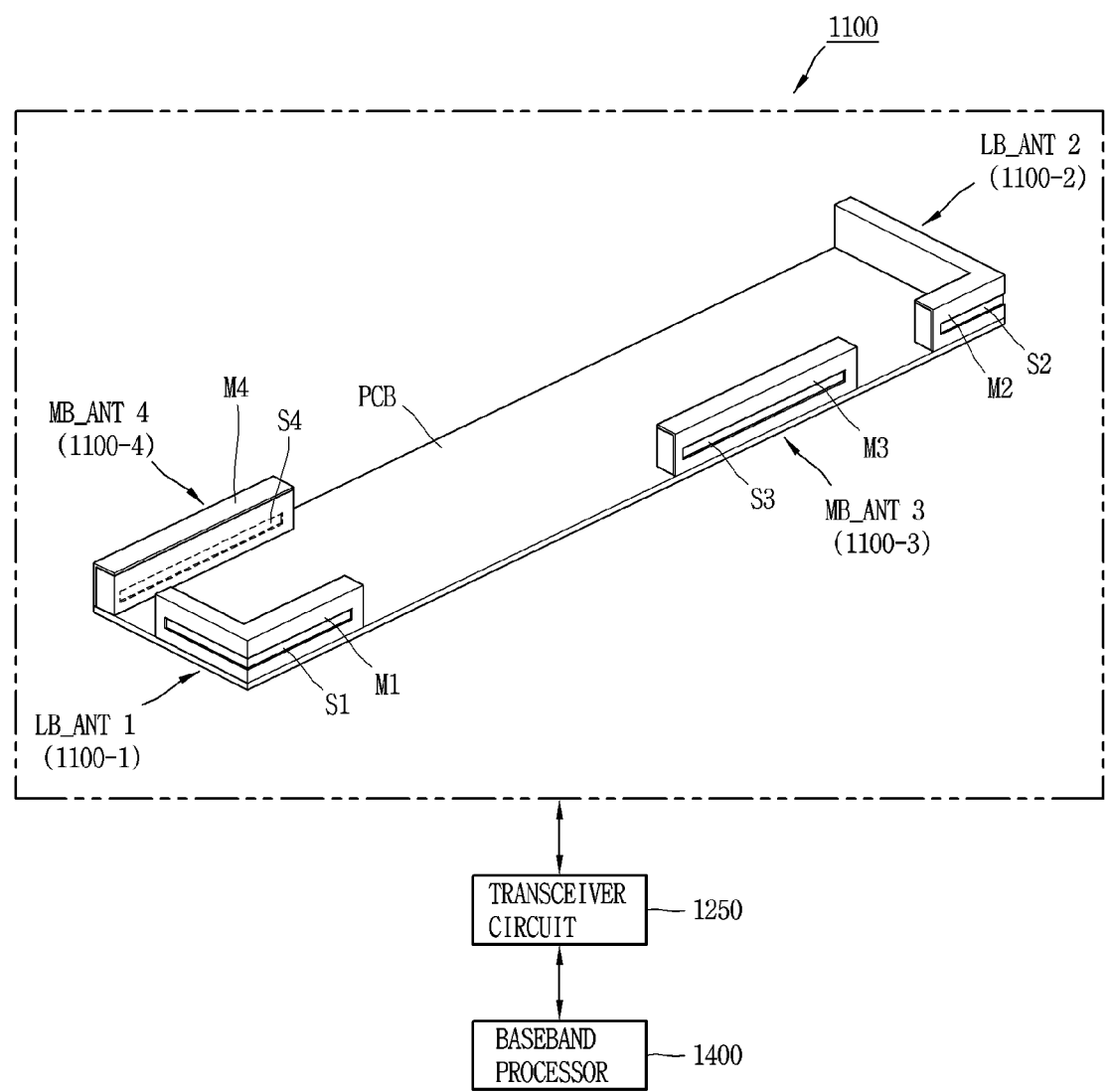
FIG. 7B is a perspective view of a plurality of antennas provided on a Main PCB of the antenna system of FIG. 7A, when viewed from a side.

Meanwhile, an antenna system according to the present disclosure may be mounted on top of or inside the roof of the vehicle or inside a roof frame. In relation to this, FIG. 6 shows an antenna system that can be mounted inside a roof frame of a vehicle according to an embodiment. FIG. 7A shows a plurality of antennas that can be disposed in an antenna system according to an embodiment and a configuration for controlling them. FIG. 7B is a perspective view of a plurality of antennas provided on a Main PCB of the antenna system of FIG. 7A, when viewed from a side.

Figure 7C:
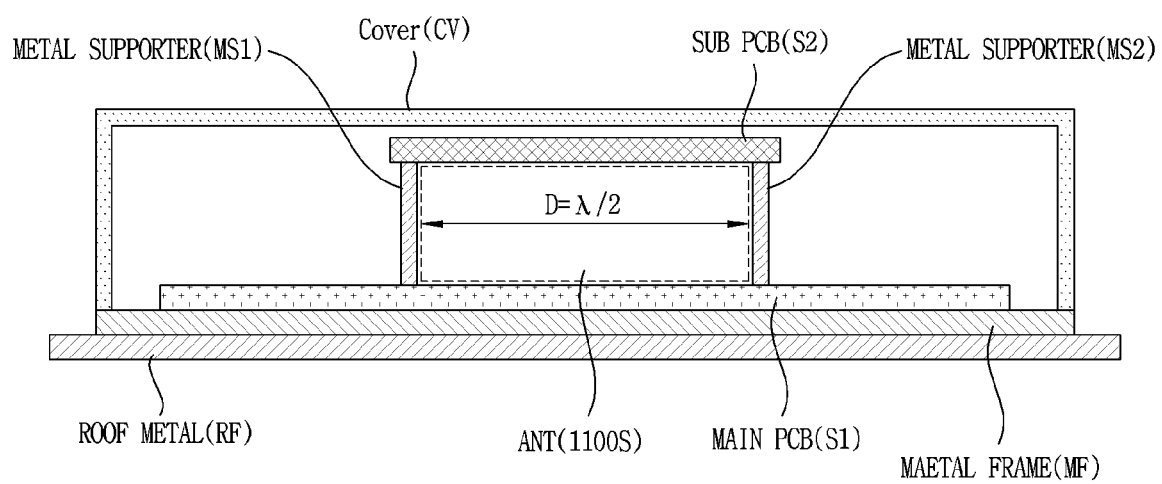
FIG. 7C shows a configuration of a slot antenna formed in a space between the Main PCB and a Sub PCB according to an embodiment.
Figure 7D:
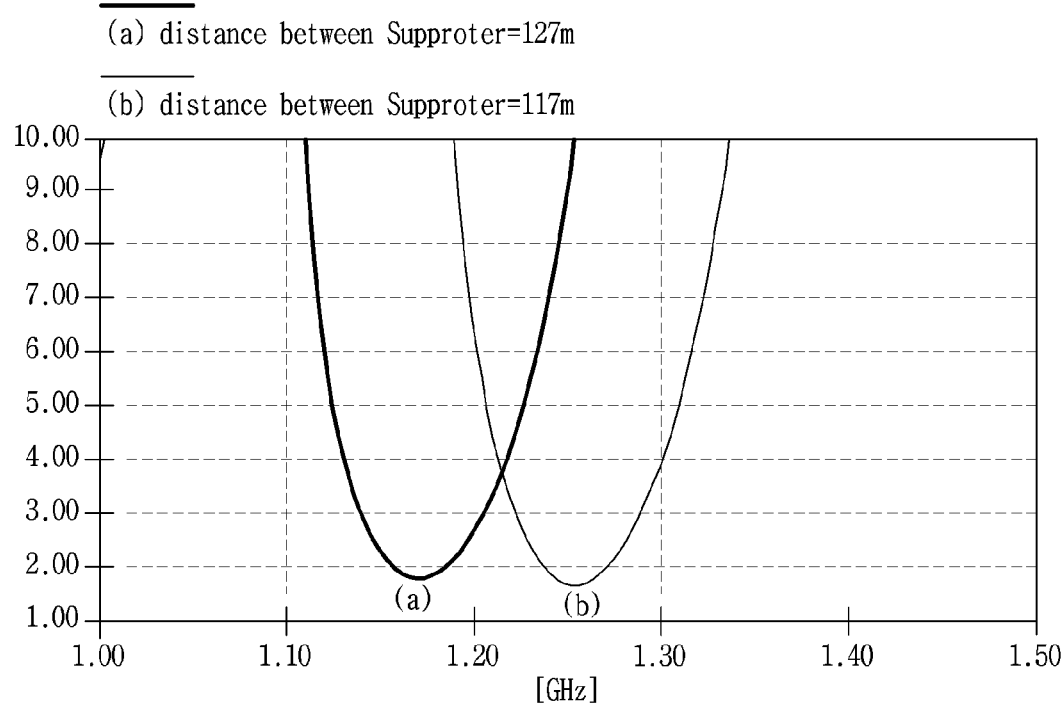
FIG. 7D shows reflection coefficient characteristics versus distance between supporters of the Main PCB and the Sub PCB.

In relation to this, FIG. 7C shows a configuration of a slot antenna formed in a space between the Main PCB and a Sub PCB according to an embodiment. FIG. 7D shows reflection coefficient characteristics versus distance between supporters of the Main PCB and the Sub PCB.

Figure 8A:
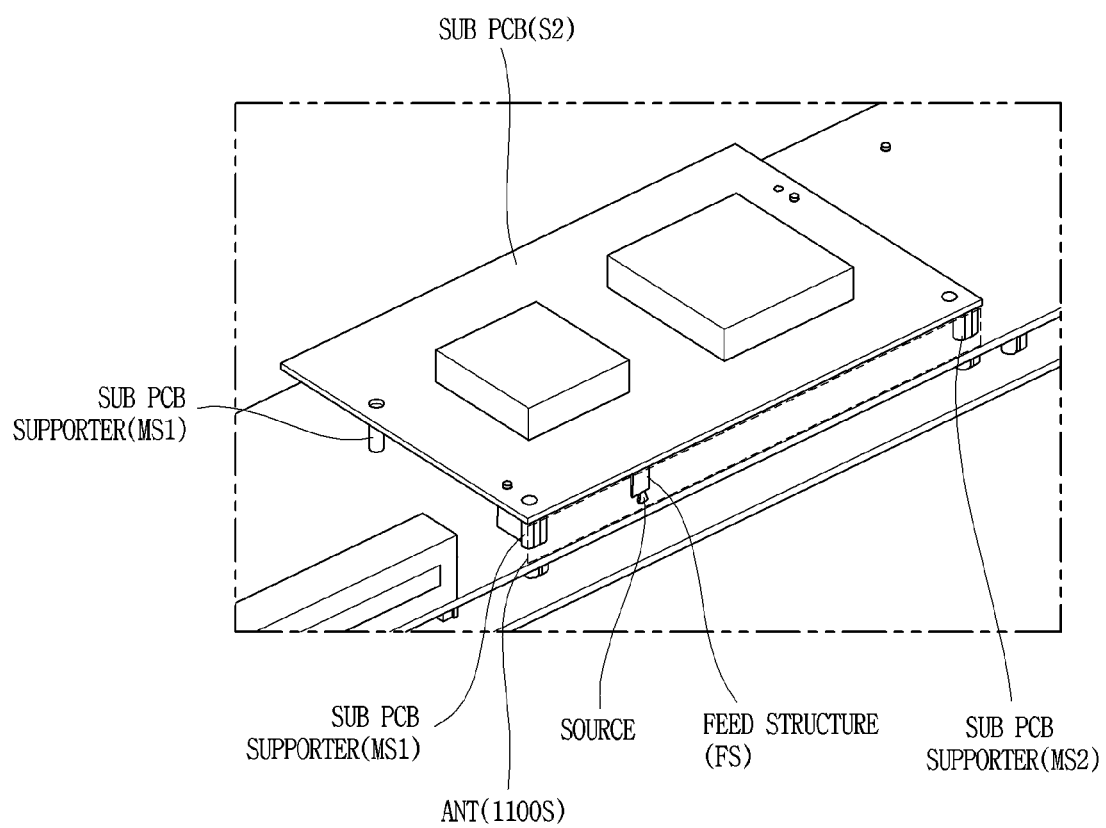
FIG. 8A shows a configuration according to an embodiment, in which the Main PCB and the Sub PCB are stacked and power is fed to a slot antenna region through a source.
Figure 8B:
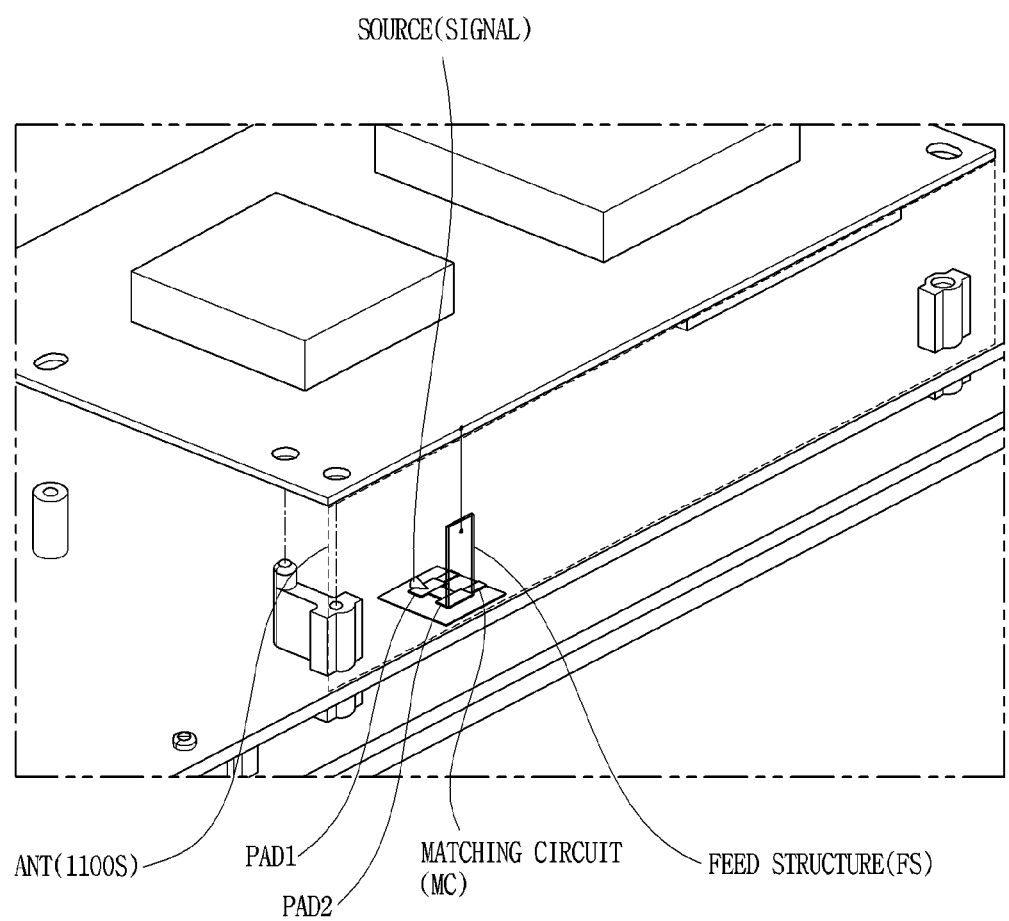
FIG. 8B shows a configuration in which the Main PCB and the Sub PCB are not held together yet.
Figure 9:
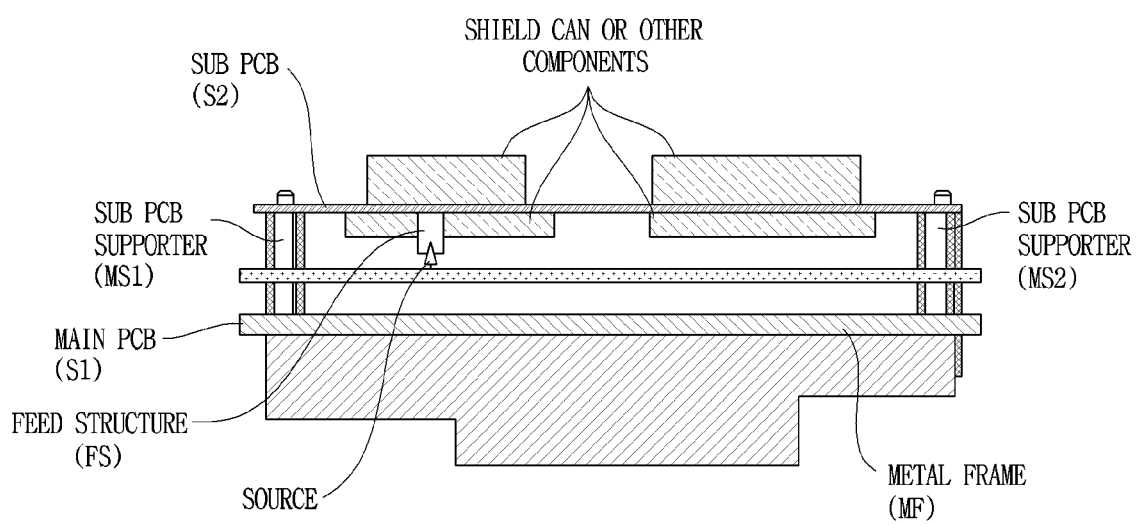
FIG. 9 is a side view showing a configuration of a slot antenna formed in a space between the Main PCB and the Sub PCB according to an embodiment.

Meanwhile, a stack structure of the Main PCB and Sub PCB constituting the slot antenna according to the present disclosure will be described below. In relation to this, FIG. 8A shows a configuration according to an embodiment, in which the Main PCB and the Sub PCB are stacked and power is fed to a slot antenna region through a source. On the other hand, FIG. 8B shows a configuration in which the Main PCB and the Sub PCB are not held together yet. FIG. 9 is a side view showing a configuration of a slot antenna formed in a space between the Main PCB and the Sub PCB according to an embodiment.

Meanwhile, the structural features and technical features of an antenna system with a slot antenna formed in a stacked PCB space according to the present disclosure will be described with reference to FIGS. 6 to 9.

In the design of an integrated antenna module mounted within a vehicle roof area, the present disclosure provides a Main PCB S1 and a Sub PCB S2 and metal supporters MS1 and MS2 supporting them. Meanwhile, a feed structure FS for source feeding is configured in a closed-loop slot region formed between the Main PCB S1 and the Sub PCB S2. Accordingly, the closed-loop slot may be used as an antenna that operates in at least one band without allocating an additional antenna space and implementing an antenna structure.

Meanwhile, the closed-loop slot formed by the Main PCB S1 and the Sub PCB S2 and their surrounding metal structures may resonate and serve as an antenna in an operating frequency range whose physical length is $\lambda/2$.

The ground of the Main PCB S1 and the ground of the Sub PCB S2 and the metal supporters may be electrically connected together to form a closed-loop slot.

Referring to FIGS. 6 to 9, the antenna system 1000 mounted on a vehicle includes a first circuit board S1, a second circuit board S2, a feed structure FS, and an antenna (ANT) 1100S. In relation to this, the antenna (ANT) 1100S may be a slot antenna formed between the first circuit board S1 and the second circuit board S2, as illustrated in FIG. 7C.

Meanwhile, the first circuit board S1 may be configured to be mountable to a metal frame MF. Also, the second circuit board S2 may be disposed so as to be spaced apart a predetermined distance from the first circuit board S1 through the metal supporters MS1 and MS2. Also, the feed structure FS may be configured in such a way as to connect between the first circuit board S1 and the second circuit board S2. That is, the feed structure FS is configured to feed power to the antenna (ANT) 1100S which is a slot antenna.

Accordingly, the antenna (ANT) 110S which is a slot antenna may be configured in such a way that a signal transmitted from the feed structure FS is radiated through the space between the first circuit board S1 and the second circuit board S2. Meanwhile, referring to FIG. 7D, it can be seen that the resonant frequency of the antenna (ANT) 1100S increases as the distance between the metal supporters MS1 and MS2 decreases from 127 mm to 117 mm. That is, it can be seen that the resonant frequency of the antenna (ANT) 1100S increases by about 0.1 GHz, from a frequency lower than 1.2 GHz to a frequency higher than 1.2 GHz.

The antenna structure proposed in this disclosure may be applied to an antenna integrated module implemented within a vehicle roof area. Also, the antenna structure proposed in this disclosure has the advantage of using essential structures without limitations on additional structures or spaces, when there is a need to implement an additional antenna apart from other antenna configurations.

Meanwhile, in the related art, in the design of an antenna integrated module, it is necessary to allocate a separate space for each antenna and re-design structures such as patterns required for antenna operation. Meanwhile, the technique proposed in the present disclosure allows for implementing one or more antenna operations without allocating an additional space or designing an additional structure in a module structure that requires a Sub PCB. In relation to this, an antenna with vertical polarization and an antenna with horizontal polarization may be implemented such that a plurality of feed structures are disposed to intersect each other between the Main PCB S1 and the Sub PCB S2. Alternatively, a ground wall may be disposed between the Main PCB S1 and the Sub PCB S2, and a plurality of feed structures may be disposed in respective areas separated by a ground wall.

Meanwhile, referring to FIGS. 8A and 8B, a slot antenna with a stacked PCB structure proposed in the present disclosure has the following structural features and technical features. In relation to this, a feeding structure for source feeding needs to be implemented within a slot, in order for the slot antenna with a stacked PCB structure to operate. This feeding structure may be configured by various forms of supporting structure such as a rod-like shape, a connector-type cable, or other shapes.

A feedline implemented on the Main PCB S1 may come into electrical contact with a ground area of the Sub PCB S2 through a feed structure. Alternatively, a feedline implemented on the Sub PCB S2 may come into electrical contact with the ground area of the Main PCB S1 through a feed structure.

Moreover, the resonant frequency and impedance matching of the antenna may be adjusted through a matching circuit MC implemented on a feed line.

Referring to FIG. 8B, the feed structure FS may include a first signal pad PAD1 and a second signal pad PAD2 and a metal post. In relation to this, the metal post alone may be called the feed structure FS. Meanwhile, a signal source may be applied between the first signal pad PAD1 and the ground of the first circuit board S1.

Meanwhile, the first signal pad PAD1 and the second signal pad PAD2 may be spaced a predetermined distance apart from each other in an area on the first circuit board from which the ground area is removed. In this case, a matching circuit MC may be disposed between the first signal pad PAD1 and the second signal pad PAD2. Also, a matching circuit MC may be disposed between the first signal pad PAD1 and the ground and the second signal pad PAD2 and the ground.

Meanwhile, the metal post may be configured in such a way as to be connected to at least one of the first signal pad PAD1 and the second signal pad PAD2. Also, the metal post may be configured in such a way as to be vertically formed between the first circuit board S1 and the second circuit board S2.

Figure 10A:
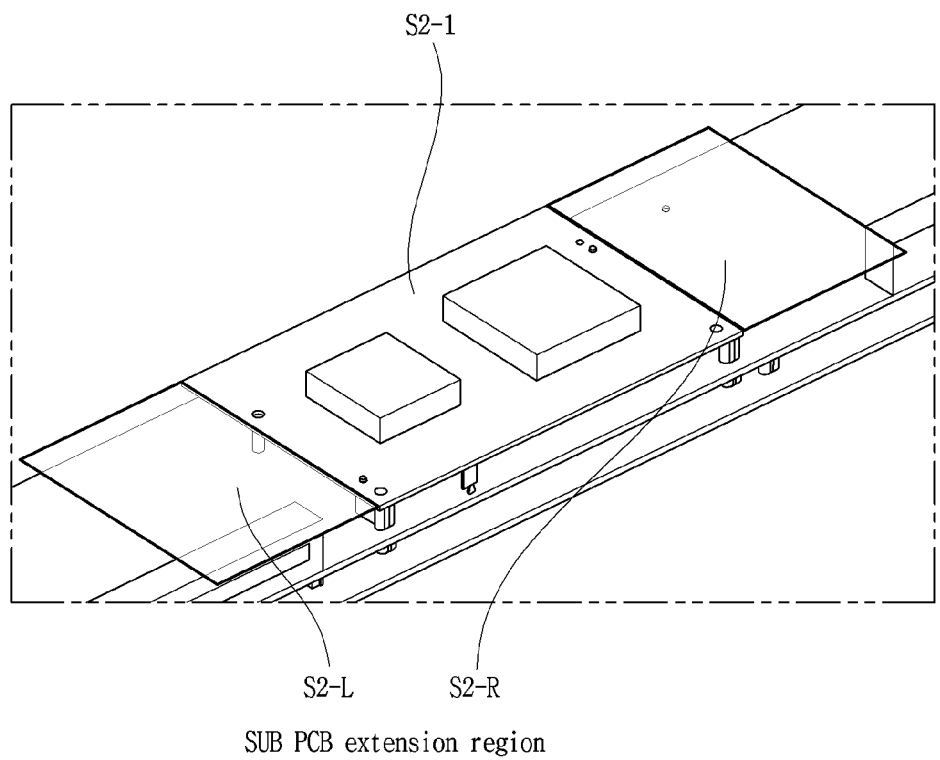
FIG. 10A shows a configuration of a second circuit board with an extended PCB according to an embodiment.

Meanwhile, the Sub PCB according to the present disclosure may extend to an adjacent area and therefore extend the slot antenna region. Thus, the resonant frequency of the slot antenna may operate in a low band LB as well. In relation to this, FIG. 10A shows a configuration of a second circuit board with an extended PCB according to an embodiment. Meanwhile, FIG. 10B shows a configuration for feeding power to an extended PCB, in an antenna structure with a Sub PCB and the extended PCB.

In relation to this, the second circuit board S2 may include a Sub PCB S2 and an extended PCB S2-L and S2-R. Here, the Sub PCB S2 may be configured in such a way that an SDARS antenna is disposed thereon. Here, the SDARS antenna may be an antenna configured to receive signals in order to obtain positional information of a vehicle, electric equipment, etc. where the antenna system is mounted.

Meanwhile, the extended PCB S2-L and S2-R may be disposed on one side or the other side of the Sub PCB S2, adjacent to the Sub PCB S2. Accordingly, the extended PCB S2-L and S2-R may be configured in such a way as to extend the area where the second circuit board is disposed.

Figure 10B:
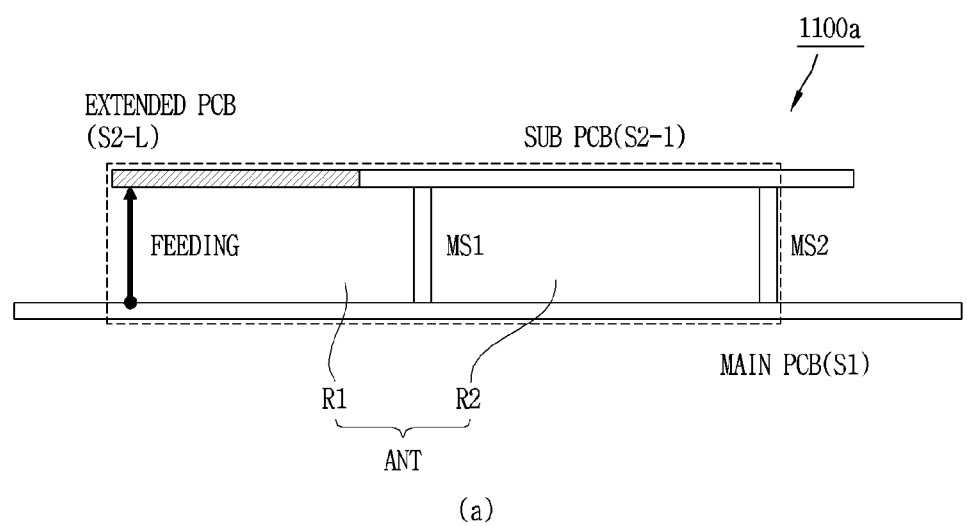
FIG. 10B shows a configuration for feeding power to an extended PCB, in an antenna structure with a Sub PCB and the extended PCB.
Figure 10B:
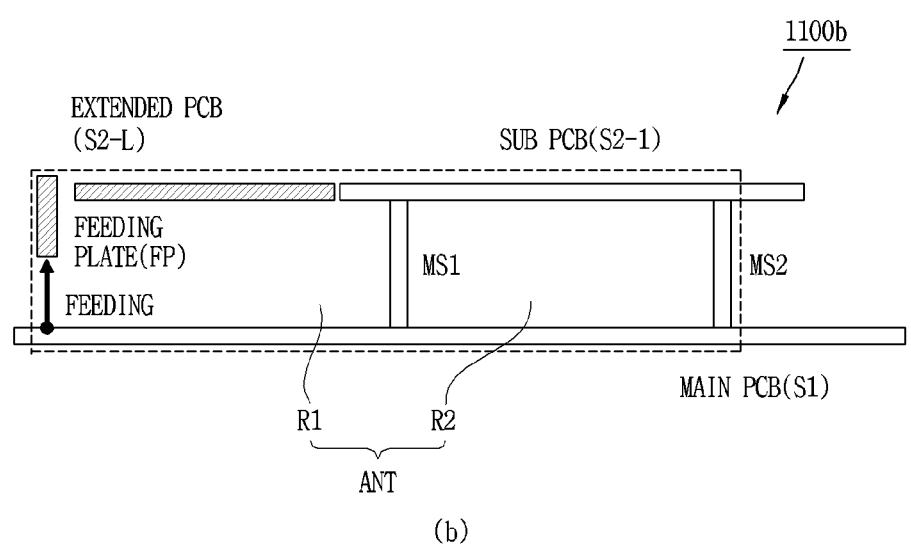

Meanwhile, referring to FIG. 8B, FIG. 10A, and (a) of FIG. 10B, the metal post of the feed structure FS which is vertically formed between the first circuit board S1 and the second circuit board S2 may be connected directly to the extended PCB S2-L.

Alternatively, referring to FIG. 8B, FIG. 10A, and (b) of FIG. 10B, the metal post of the feed structure FS may be spaced apart from the extended PCB S2-L so as to feed power to it by coupling. In relation to this, the metal post of the feed structure FS may be connected to a feed plate FP which is vertically spaced apart from the extended PCB S2-L of the second circuit board. Meanwhile, the feed plate FP vertically formed between the first circuit board S1 and the second circuit board S2 may be disposed a predetermined distance apart from the extended PCB S2-L. In this case, signals from the feed plate FP may be coupled to the extended PCB S2-L.

Meanwhile, signals from the metal post of the feed structure FS may be radiated through regions corresponding to the feed structure, the extended PCB S2-L, the Sub PCB S2, the metal supporters MS1 and MS2, and the first PCB S1. In relation to this, the antenna 1100a and 1100b may resonate at a first frequency through a first region R1 formed by one MS1 of the metal supporters. Also, the antenna 1100a and 1100b may resonate at a second frequency through a second region R2 formed by the other metal supporter.

Meanwhile, a slot antenna using a space between stacked circuit boards according to the present disclosure may optimize the antenna characteristics by variously altering the structure of the metal plate. Also, a main substrate of an antenna system with a slot antenna and a plurality of antennas may be disposed so as to be spaced apart a predetermined distance from the metal frame of the vehicle, thereby improving the heat dissipation characteristics.

Figure 11A:
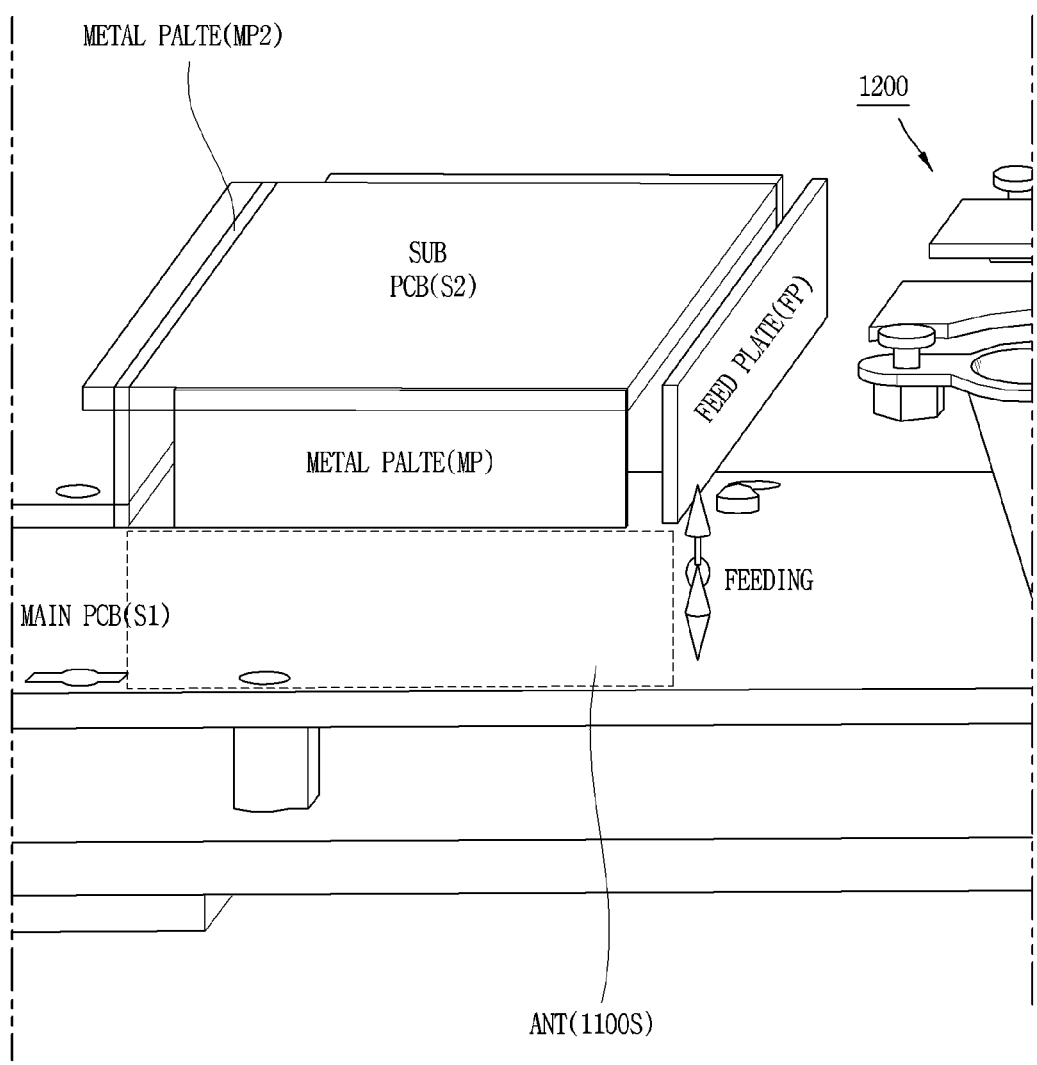
FIG. 11A shows an antenna configuration with a main PCB, a Sub PCB, and a plurality of metal plates according to an embodiment.
Figure 11B:
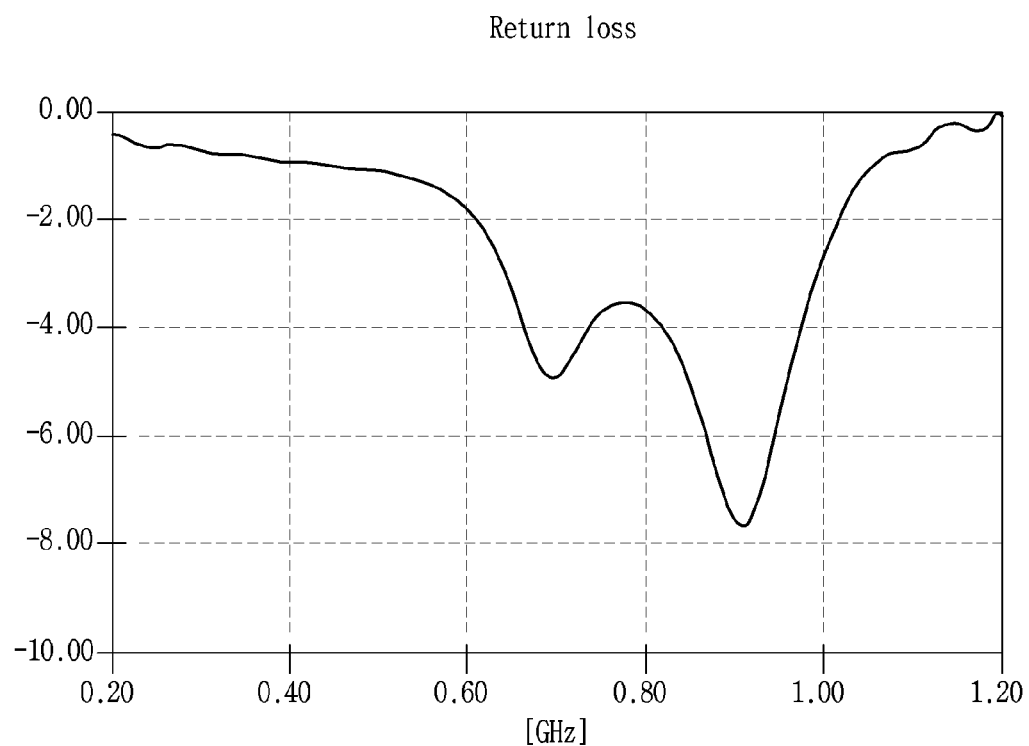
FIG. 11B shows reflection coefficient characteristics of a slot antenna at a specific position of a feed structure through a feed plate in the structure of FIG. 11A.
Figure 11C:
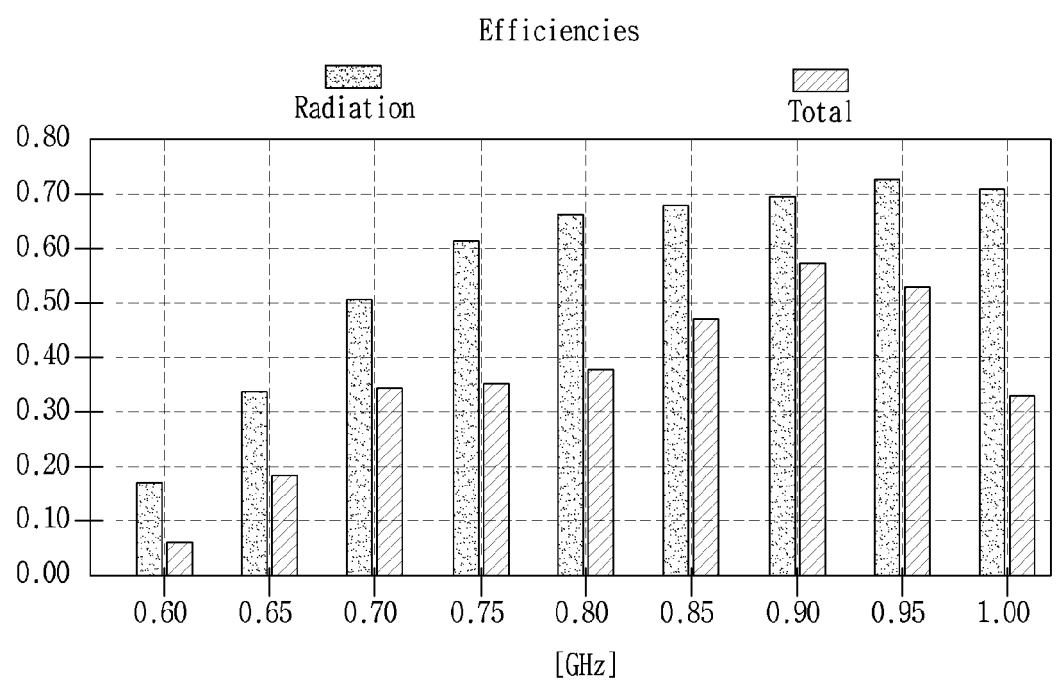
FIG. 11C shows the radiation efficiency and total efficiency for each frequency of a slot antenna according to an embodiment.

In relation to this, FIG. 11A shows an antenna configuration with a main PCB, a Sub PCB, and a plurality of metal plates according to an embodiment. Meanwhile, FIG. 11B shows reflection coefficient characteristics of a slot antenna at a specific position of a feed structure through a feed plate in the structure of FIG. 11A. Also, FIG. 11C shows the radiation efficiency and total efficiency for each frequency of a slot antenna according to an embodiment.

Referring to FIG. 11A, the first circuit board S1 may be disposed so as to be spaced apart a predetermined distance from the metal frame of the vehicle. Meanwhile, a metal plate MP may be disposed on the front of the Sub PCB S2 of the second circuit board.

Meanwhile, a second metal plate MP2 may be disposed on one side of the Sub PCB S2 of the second circuit board. Also, a feed plate FP connected to a feed post may be disposed on the other side of the Sub PCB S2 of the second circuit board, spaced a predetermined distance apart from the Sub PCB S2.

Referring to FIGS. 11A and 11B, another metal plate MP may be disposed in a slot region between the first circuit board S1 and the Sub PCB S2 of the second circuit board, thereby enabling dual-band resonance. Accordingly, the slot antenna based on a PCB stack structure according to the present disclosure may be configured to cover a low band LB of 1 GHz or below. Meanwhile, although dual-band resonance is possible by disposing another metal plate MP in the slot region, impedance matching is hardly considered perfect. In relation to this, referring to FIG. 11C, it can be seen that, while the radiation efficiency in the low band LB was sufficient for proper antenna operation, the total efficiency decreased to some extent.

Figure 12A:
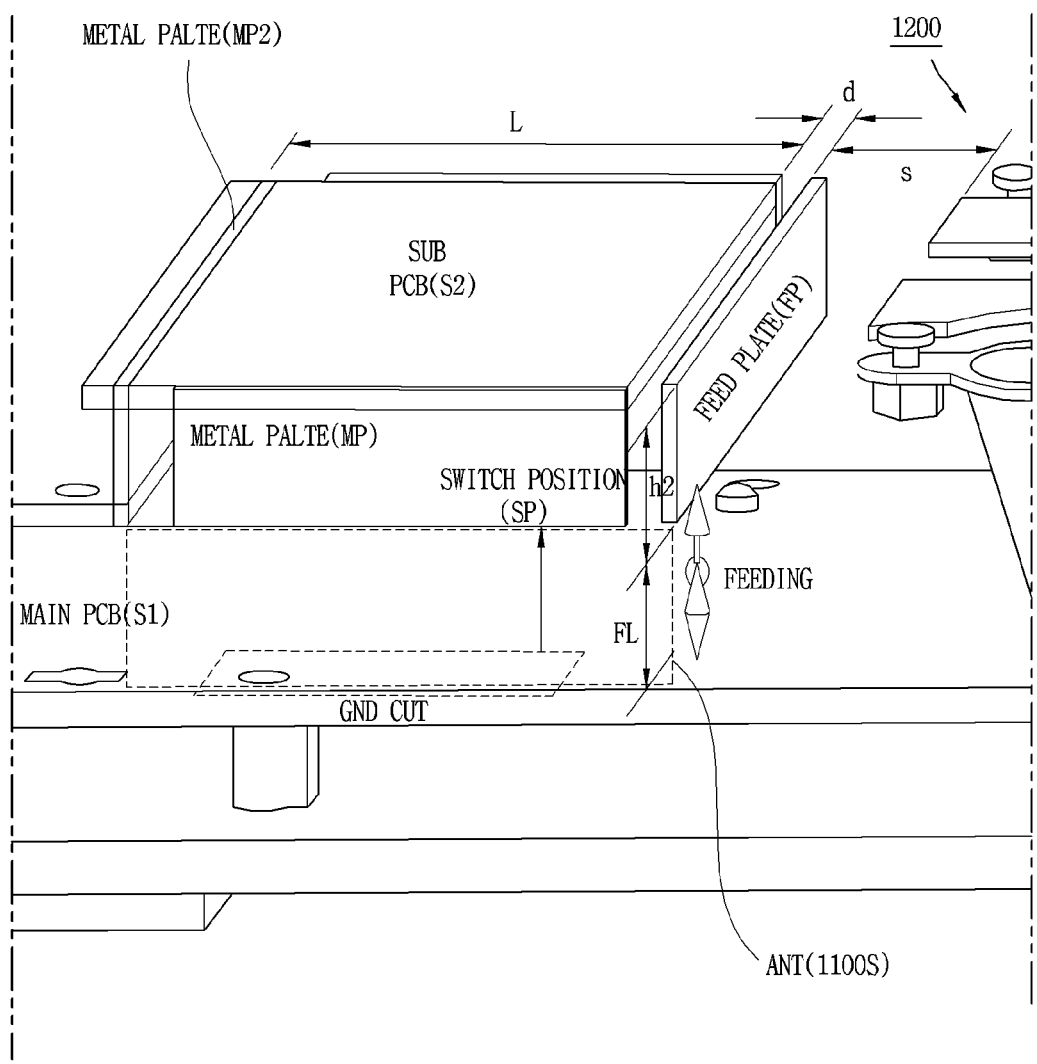
FIG. 12A shows an antenna configuration with a main PCB, a Sub PCB, a plurality of metal plates, and a switching unit according to another embodiment.
Figure 12B:
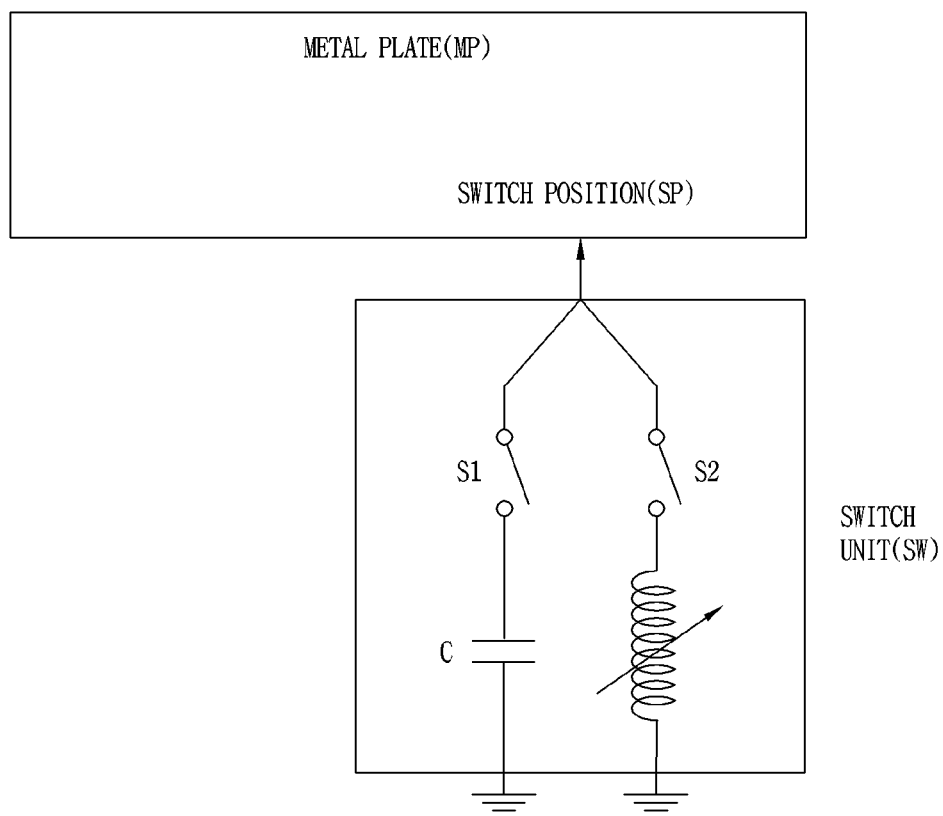
FIG. 12B shows a configuration of a switching unit connected to one point on a metal plate on the front of the Sub PCB in the configuration of FIG. 12A.
Figure 12C:
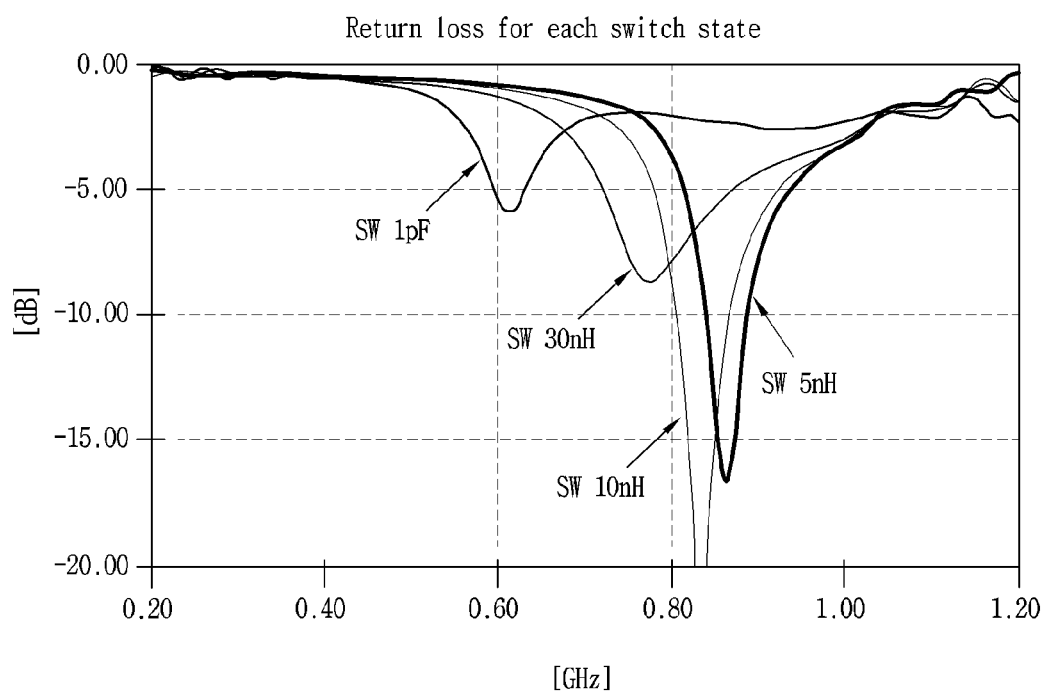
FIG. 12C shows the reflection coefficient of a slot antenna versus the impedance value of a device which varies by controlling the switching unit of FIG. 12B.

Accordingly, the impedance matching of the antenna may be performed by disposing a switching unit between the metal plate MP and the first circuit board S1 and turning on/off a device with a particular impedance value or varying the impedance value. In relation to this, FIG. 12A shows an antenna configuration with a main PCB, a Sub PCB, a plurality of metal plates, and a switching unit according to another embodiment. Meanwhile, FIG. 12B shows a configuration of a switch unit connected to one point on a metal plate on the front of the Sub PCB in the configuration of FIG. 12A. Also, FIG. 12C shows the reflection coefficient of a slot antenna versus the impedance value of a device which varies by controlling the switching unit of FIG. 12B.

Referring to FIG. 12A, the first circuit board S1 may be disposed so as to be spaced apart a predetermined distance from the metal frame of the vehicle. Meanwhile, a metal plate MP may be disposed on the front of the Sub PCB S2 of the second circuit board.

Meanwhile, a second metal plate MP2 may be disposed on one side of the Sub PCB S2 of the second circuit board. Also, a feed plate FP connected to a feed post may be disposed on the other side of the Sub PCB S2 of the second circuit board, spaced a predetermined distance apart from the Sub PCB S2.

In relation to this, the length of the Sub PCB S2 corresponding to the slot length is denoted by L. Accordingly, if the length L of the Sub PCB S2 falls within a resonant length range, it may operate as a slot antenna. Meanwhile, the feed plate FP may be disposed a predetermined distance of d apart from the Sub PCB S2.

In relation to this, the feed plate FP may be spaced apart from the first circuit board S1 by a distance of FL. In relation to this, the feed structure may be formed as a structure having a height of h2.

Meanwhile, another antenna 1200 may be disposed, apart from the slot antenna formed on the Sub PCB S2. In relation to this, the antenna 1200 may be a cone antenna which is configured to operate in a mid band MB and a high band HB. The cone antenna 1200 may include a cone radiator, a metal patch, and a shorting pin. Meanwhile, a slot antenna using a space between stacked PCB s according to the present disclosure may be disposed together with an antenna having the shape of a dielectric structure as shown in FIGS. 7A and 7B. Alternatively, the slot antenna using a space between stacked PCBs according to the present disclosure may be disposed together with the cone antenna 1200 as shown in FIG. 12A.

Meanwhile, referring to FIGS. 12A and 12B, the metal plate MP may be configured in such a way as to be connected to a switching unit SW with a plurality of terminals having different capacitance and inductance values and change the resonant frequency of the antenna. In this case, the switching unit SW may be vertically connected at a particular position SP which is on the metal plate MP and the first circuit board S1. Also, the slot antenna characteristics may be optimized by removing the ground layer for some part of the ground area formed on the first circuit board S1.

Meanwhile, the switching unit SW may include a capacitor having a specific capacitance (C) value, an inductor having a variable inductance value, and first and second switches S1 and S2 respectively connected to them. However, the switching unit SW is not limited to the above configuration, but may include a capacitor having a variable capacitance value, an inductor having a variable inductance value, and first and second switches S1 and S2 respectively connected to them.

Figure 13A:
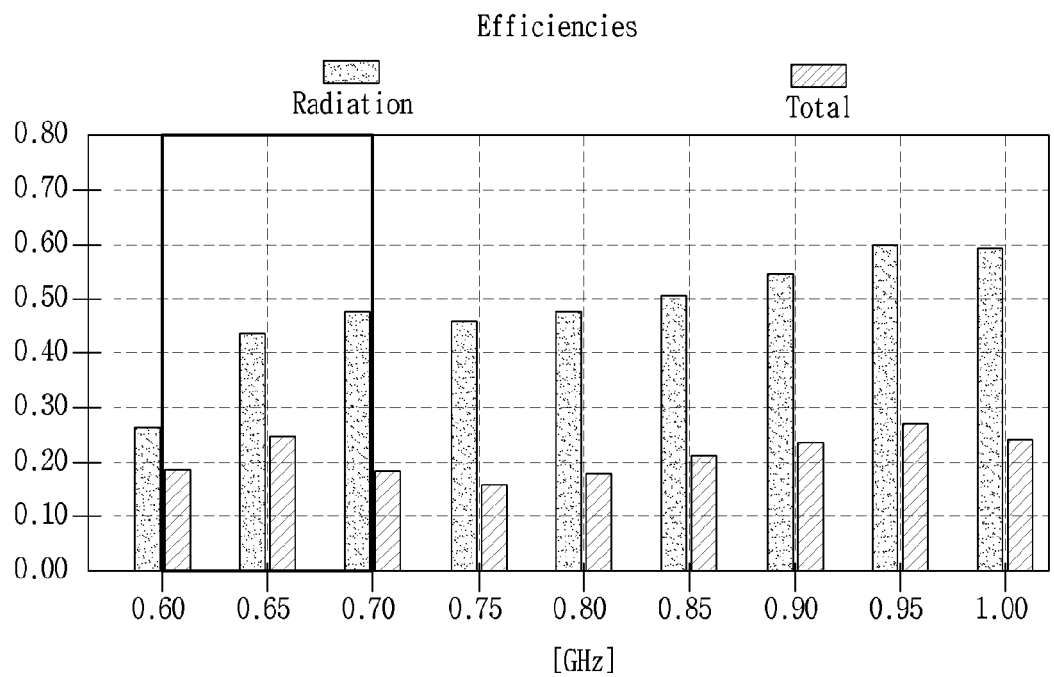
FIG. 13A shows the radiation efficiency and total efficiency when different PCBs are connected according to an embodiment.
Figure 13A:
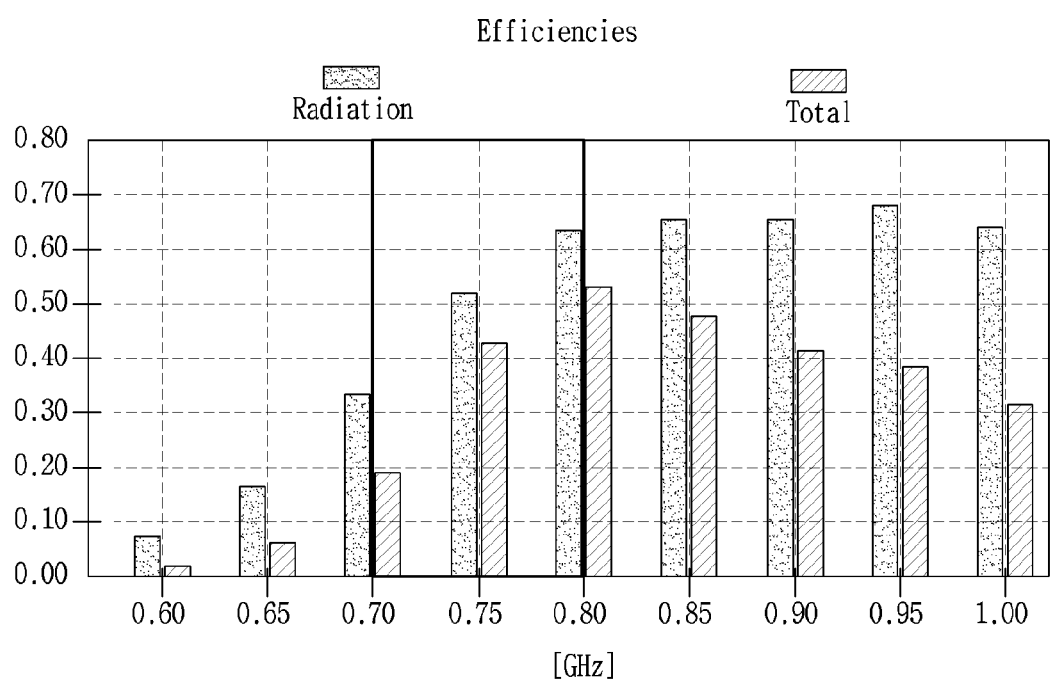

Meanwhile, FIG. 13A shows the radiation efficiency and total efficiency when different PCBs are connected according to an embodiment. On the other hand, FIG. 13B shows the radiation efficiency and total efficiency when different PCBs are connected according to another embodiment.

In relation to this, FIGS. 12A to 12C and (a) of FIG. 13A show the radiation efficiency and total efficiency of the antenna (ANT) 1100S when the switching unit SW is connected through a capacitor. In this case, it can be seen that the antenna (ANT) 1100S showed an improvement in antenna characteristics at 0.6 GHz to 0.7 GHz.

Meanwhile, FIGS. 12A to 12C and (b) of FIG. 13A show the radiation efficiency and total efficiency of the antenna (ANT) 1100S when the switching unit SW is connected through an inductor and the inductance is adjusted to a first inductance (e.g., 30 nH). In this case, it can be seen that the antenna (ANT) 1100S showed an improvement in antenna characteristics at 0.7 GHz to 0.8 GHz.

Figure 13B:
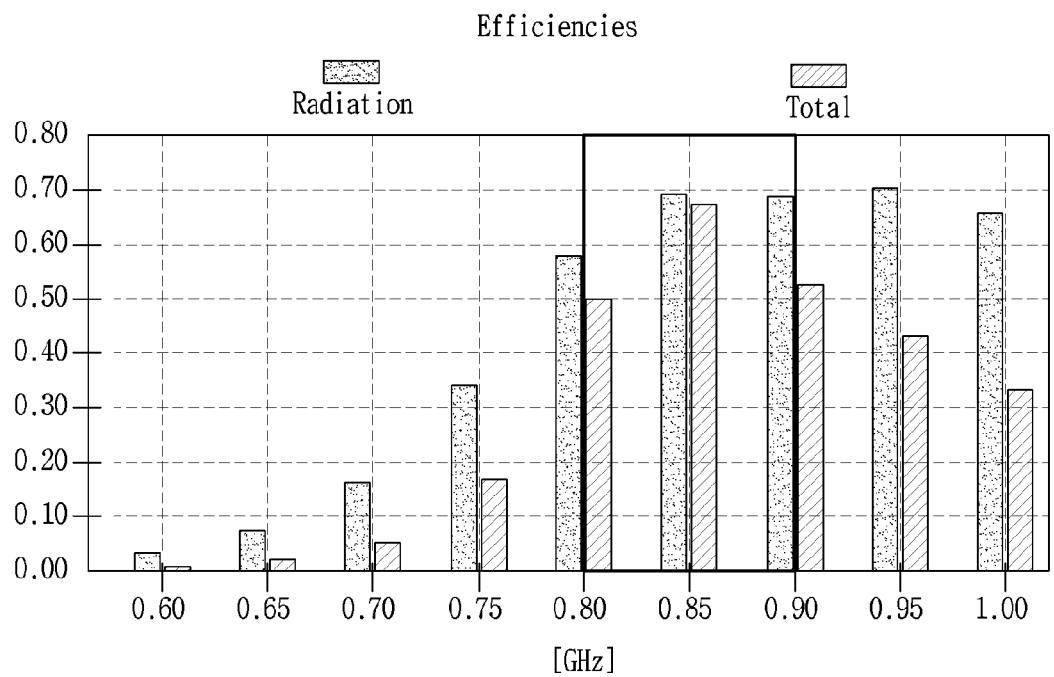
FIG. 13B shows the radiation efficiency and total efficiency when different PCBs are connected according to another embodiment.
Figure 13B:
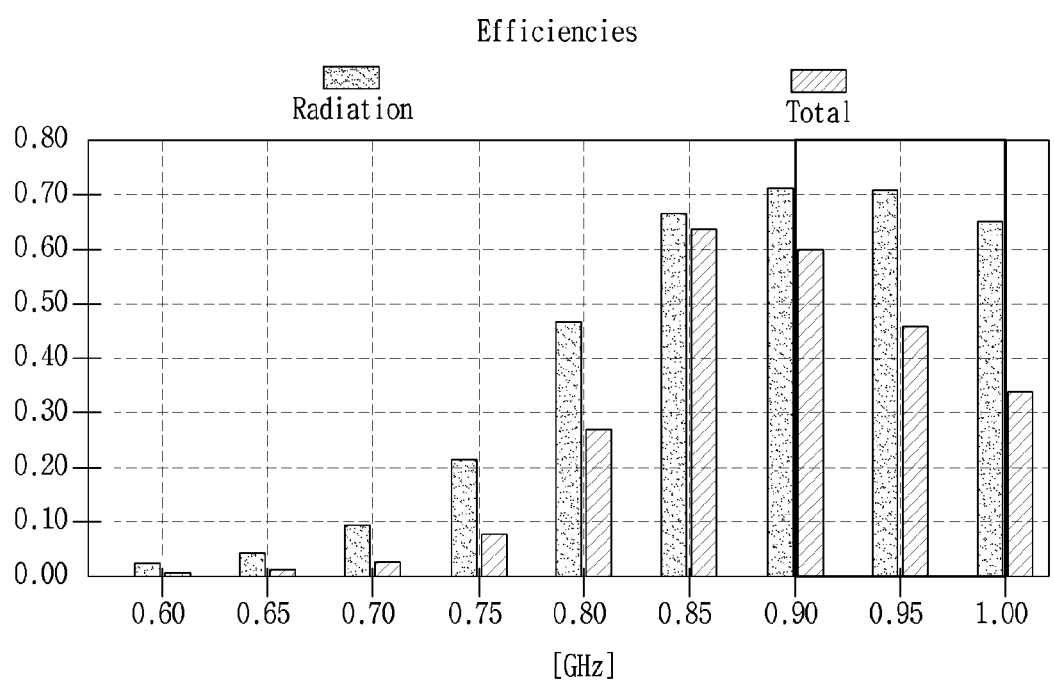

FIGS. 12A to 12C and (a) of FIG. 13B show the radiation efficiency and total efficiency of the antenna (ANT) 1100S when the switching unit SW is connected through an inductor and the inductance is adjusted to a second inductance (e.g., 10 nH). In this case, it can be seen that the antenna (ANT) 1100S showed an improvement in antenna characteristics at 0.8 GHz to 0.9 GHz. Here, the second inductance may be set to be lower than the first inductance.

Meanwhile, FIGS. 12A to 12C and (b) of FIG. 13B show the radiation efficiency and total efficiency of the antenna (ANT) 1100S when the switching unit SW is connected through an inductor and the inductance is adjusted to a third inductance (e.g., 5 nH). In this case, it can be seen that the antenna (ANT) 1100S showed an improvement in antenna characteristics at 0.9 GHz to 1.0 GHz. Here, the third inductance may be set to be lower than the second inductance.

Accordingly, in the present disclosure, the resonant frequency in the low band LB may be adjusted by using impedance matching through the switching unit SW at a predetermined position on the metal plate MP disposed on the front of the Sub PCB P2 of the second circuit board. Thus, the slot antenna (ANT) 1100S with a stacked PCB structure is capable of wide-band operation.

Meanwhile, referring to FIGS. 7A to 13B, the slot antenna (ANT) 1100S with a stacked PCB structure may be operably coupled to the transceiver circuit 1250 and the baseband processor 1400.

In relation to this, the transceiver circuit 1250 may be configured to transmit signals to the antenna (ANT) 1100S through the feed structure FS. In relation to this, the transceiver circuit 1250 may be disposed on the front or back of the first circuit board S1. For example, the transceiver circuit 1250 may be disposed on the back of the first circuit board S1 and accommodated in a space between the first circuit board S1 and the metal frame.

Meanwhile, a plurality of antennas 1100-1 to 1100-4 may be disposed on the first circuit board which is the main PCB forming the slot antenna according to the present disclosure. Referring to FIG. 7B, the first antenna (LB-ANT1) 1100-1 may be configured to radiate a first signal through a first metal pattern M1 printed on a first dielectric structure and a first slot S1. Thus, the first antenna (LB_ANT1) 1100-1 may be configured to be connected to the first circuit board S1 through a first feed structure. Also, the second antenna (LB_ANT2) 1100-2 may be configured to radiate a second signal through a second metal pattern M2 printed on a second dielectric structure and a second slot S2. Thus, the second antenna (LB_ANT2) 1100-2 may be configured to be connected to the first circuit board S1 through a second feed structure.

Meanwhile, the transceiver circuit 1250 may be controlled to radiate signals through at least one of the antenna (ANT) 1100S, the first antenna (LB_ANT1) 1100-1, and the second antenna (LB_ANT2) 1100-2. In relation to this, the first antenna (LB_ANT1) 1100-1 may operate in a first band corresponding to the low band LB and include a first portion and a second portion so as to be connected to one side and one edge of the circuit board PCB. Also, the second antenna (LB_ANT2) 1100-2 may operate in the first band corresponding to the low band LB and include a first portion and a second portion so as to be connected to the other side and one edge of the circuit board PCB.

Meanwhile, a baseband processor 1400 may be operably coupled to the transceiver circuit 1250 and configured to control the transceiver circuit so as to perform MIMO in the first band corresponding to the low band LB through a plurality of antennas. In relation to this, the plurality of antennas may be low-band (LB) antennas including the antenna (ANT) 1100S, the first antenna (LB_ANT1) 1100-1, and the second antenna (LB_ANT2) 1100-2.

In relation to this, the level of interference may increase depending on mutual interference while MIMO is being performed through the first antenna (LB_ANT1) 1100-1 and the second antenna (LB_ANT2) 1100-2. Accordingly, if the quality of the first signal received through the first antenna (LB_ANT1) 1100-1 or the quality of the second signal received through the second antenna (LB_ANT2) 1100-2 is lower than a threshold, the baseband processor 1400 may receive a signal through the antenna (ANT) 1100S.

Accordingly, the baseband processor 1400 may perform DL-MIMO by using the first signal received through the first antenna (LB_ANT1) 1100-1 and the signal received through the antenna (ANT) 1100S. Also, the baseband processor 1400 may perform DL-MIMO by using the second signal received through the second antenna (LB_ANT2) 1100-2 and the signal received through the antenna (ANT) 1100S.

As described above, the level of interference may increase depending on mutual interference while MIMO is being performed through the first antenna (LB_ANT1) 1100-1 and the second antenna (LB_ANT2) 1100-2. Accordingly, if the quality of the first signal transmitted through the first antenna (LB_ANT1) 1100-1 or the quality of the second signal transmitted through the second antenna (LB_ANT2) 1100-2 is lower than a threshold, the baseband processor 1400 may transmit a signal through the antenna (ANT) 1100S.

Accordingly, the baseband processor 1400 may perform UL-MIMO by using the first signal received through the first antenna (LB_ANT1) 1100-1 and the signal transmitted through the antenna (ANT) 1100S. Also, the baseband processor 1400 may perform UL-MIMO by using the second signal transmitted through the second antenna (LB_ANT2) 1100-2 and the signal received through the antenna (ANT) 1100S.

Meanwhile, an antenna operating in the mid band MB according to the present disclosure also may be disposed on the circuit board PCB, together with the low-band (LB) antennas. In relation to this, a third antenna (MB_ANT3) 1100-3 may be configured to radiate a third signal through a third metal pattern M3 printed on a third dielectric structure and a third slot S3. In relation to this, the third dielectric structure of the third antenna (MB_ANT3) 1100-3 may be disposed on one edge of the circuit board, and the third antenna (MB_ANT3) 1100-3 may be configured to be connected to the circuit board PCB through a third feed structure.

Meanwhile, a fourth antenna (MB_ANT4) 1100-4 may be configured to radiate a fourth signal through a fourth metal pattern M4 printed on a fourth dielectric structure and a fourth slot S4. In relation to this, the fourth dielectric structure of the fourth antenna (MB_ANT4) 1100-4 may be disposed on the other edge of the circuit board, and the fourth antenna (MB_ANT4) 1100-4 may be configured to be connected to the circuit board PCB through a fourth feed structure. Here, the third signal and the fourth signal may be signals in a second band corresponding to the mid band MB.

In relation to this, the third antenna (MB_ANT3) 1100-3 and the fourth antenna (MB_ANT4) 1100-4 which operate in the same band may be disposed on different edges of the circuit board PCB. Accordingly, the third antenna (MB_ANT3) 1100-3 and the fourth antenna (MB_ANT4) 1100-4 may reduce the level of mutual interference and improve isolation.

As a plurality of mid-band MB antennas are disposed, MIMO may be performed in the second band. In relation to this, the baseband processor 1400 may be operably coupled to the transceiver circuit 1250, and control the transceiver circuit 1250 to perform MIMO in the second band corresponding to the mid band MB. The baseband processor 1400 may be configured to perform MIMO in the second band through the third antenna (MB_ANT3) 1100-3 and the fourth antenna (MB_ANT4) 1100-4.

Meanwhile, carrier aggregation CA may be performed to increase communication capacity. In relation to this, the baseband processor 1400 may perform carrier aggregation CA through the first signal in the first band and the third signal in the second band. That is, the baseband processor 1400 may perform carrier aggregation CA through the first signal in the first band received through the first antenna (LB_ANT1) 1100-1 and the third signal in the second band received through the third antenna (MB_ANT3) 1100-3.

In relation to this, carrier aggregation CA may be performed by using the third antenna (MB_ANT3) 1100-3 which is spaced farther apart from the first antenna (LB_ANT1) 1100-1 than the adjacent fourth antenna (MB_ANT4) 1100-4. Accordingly, the level of interference between adjacent bands may be reduced at the time of carrier aggregation CA.

Meanwhile, when carrier aggregation is performed through the first signal in the first band and the third signal in the second band, if the quality of the first signal or the third signal is lower than a threshold, the carrier aggregation CA may be performed through other antennas. In relation to this, the baseband processor 1400 may perform carrier aggregation CA through the second signal in the first band and the fourth signal in the second band. That is, the baseband processor 1400 may perform carrier aggregation CA through the second signal in the first band received through the second antenna (LB_ANT2) 1100-2 and the fourth signal in the second band received through the fourth antenna (MB_ANT4) 1100-4.

In relation to this, carrier aggregation CA may be performed by using the fourth antenna (MB_ANT4) 1100-4 which is spaced farther apart from the second antenna (LB_ANT2) 1100-2 than the adjacent third antenna (MB_ANT3) 1100-3. Accordingly, the level of interference between adjacent bands may be reduced at the time of carrier aggregation CA.

Meanwhile, the baseband processor 1400 may perform MIMO by using carrier-aggregated signals. In this case, the isolation between respective MIMO streams is more important than the isolation between CA signals. Accordingly, the baseband processor 1400 may obtain first information through the first signal in the first band and the fourth signal in the second band and obtain second information through the second signal in the first band and the third signal in the second band. Thus, the baseband processor 1400 may reduce the level of interference between MIMO streams while performing DL-MIMO on the carrier-aggregated signals. In this case, the baseband processor 1400 controls such that a first CA signal is received through the fourth antenna (MB_ANT4) 1100-4 adjacent to the first antenna (LB_ANT1) 1100-1. Also, the baseband processor 1400 controls such that a second CA signal is received simultaneously through the third antenna (MB_ANT3) 1100-3 adjacent to the second antenna (LB_ANT2) 1100-2.

Similarly, the baseband processor 1400 may reduce the level of interference between MIMO streams while performing UL-MIMO on the carrier-aggregated signals. In this case, the baseband processor 1400 controls such that a first CA signal is transmitted through the fourth antenna (MB_ANT4) 1100-4 adjacent to the first antenna (LB_ANT1) 1100-1. Also, the baseband processor 1400 controls such that a second CA signal is transmitted simultaneously through the third antenna (MB_ANT3) 1100-3 adjacent to the second antenna (LB_ANT2) 1100-2.

Meanwhile, an antenna operating in the high band HB according to the present disclosure may be disposed on the circuit board PCB, together with a low-band (LB) antennas and/or a mid-band (MB) antenna. In relation to this, a detailed description of the configuration structure and operation of the antenna operating in the high band HB will be omitted.

Meanwhile, MIMO may be performed by using a slot-structure antenna (ANT) 1100S formed by stacked PCBs according to the present disclosure. In relation to this, if the quality of the first signal in the first band received through the first antenna (LB_ANT1) 1100-1 is lower than a threshold, the baseband processor 1400 may perform MIMO through the antenna (ANT) 1100-S and the second antenna (LB_ANT2) 1100-2. Also, if the quality of the second signal in the first band received through the second antenna (LB_ANT2) 1100-2 is lower than a threshold, the baseband processor 1400 may perform MIMO through the antenna (ANT) 1100S and the first antenna (LB_ANT1) 1100-1.

Meanwhile, carrier aggregation CA may be performed by using a slot-structure antenna (ANT) 1100S formed by stacked PCBs according to the present disclosure. In relation to this, the baseband processor 1400 may perform carrier aggregation CA through the first signal or second signal in the first band or the third signal in the second band. Here, the first signal may be received through the first antenna (LB_ANT1) 1100-1, and the second signal may be received through the second antenna (LB_ANT2) 1100-2. Also, the third signal in the second band may be received through the third antenna (MB_ANT3) 1100-3.

In relation to this, if the quality of the first signal or the second signal is lower than a threshold, carrier aggregation CA may be performed through a signal in the first band received through the antenna (ANT) 1100S and the third signal.

For another example, the baseband processor 1400 may perform carrier aggregation CA through the first signal or second signal in the first band and the fourth signal in the second band. Here, the first signal may be received through the first antenna (LB_ANT1) 1100-1, and the second signal may be received through the second antenna (LB_ANT2) 1100-2. Also, the fourth signal in the second band may be received through the fourth antenna (MB_ANT4) 1100-4.

In relation to this, if the quality of the first signal or the second signal is lower than a threshold, carrier aggregation CA may be performed through a signal in the first band received through the antenna (ANT) 1100S and the fourth signal.

Meanwhile, the baseband processor 1400 may perform carrier aggregation CA through the first signal or second signal in the first band and the third signal in the second band. Here, the first signal may be transmitted through the first antenna (LB_ANT1) 1100-1, and the second signal may be transmitted through the second antenna (LB_ANT2) 1100-2. Also, the third signal in the second band may be transmitted through the third antenna (MB_ANT3) 1100-3.

In relation to this, if the quality of the first signal or the second signal is lower than a threshold, carrier aggregation CA may be performed through a signal in the first band transmitted through the antenna (ANT) 1100S and the third signal.

For another example, the baseband processor 1400 may perform carrier aggregation CA through the first signal or second signal in the first band and the fourth signal in the second band. Here, the first signal may be transmitted through the first antenna (LB_ANT1) 1100-1, and the second signal may be transmitted through the second antenna (LB_ANT2) 1100-2. Also, the fourth signal in the second band may be transmitted through the fourth antenna (MB_ANT4) 1100-4.

In relation to this, if the quality of the first signal or the second signal is lower than a threshold, carrier aggregation CA may be performed through a signal in the first band transmitted through the antenna (ANT) 1100S and the fourth signal.

Meanwhile, it is possible for a vehicle to perform wireless communication with an entity external to the vehicle in the low band LB, mid band MB, and high band HB through the antenna systems 1000 with a plurality of antennas 1100 according to the present disclosure. In relation to this, the plurality of antennas 1100 of the antenna system 1000 that can be mounted within a vehicle roof frame may be configured to radiate signals outward. To this end, the first antenna (LB_ANT1) 1100-1 to fourth antenna (MB_ANT4) 1100-4 may be configured to radiate first to fourth signals through the first slot S1 to the fourth slot S4. That is, they may be configured to radiate first to fourth signals outward through the first slot S1 to fourth slot S4 formed on the outer side of the circuit board PCB.

As described above, the plurality of antennas 1100-1 to 1100-4 and the slot antenna (ANT) 1100S, which operate in the low band LB and the mid band MB according to the present disclosure, may be operably coupled to the transceiver circuit 1250. In relation to this, the transceiver circuit 1250 may be disposed on the front or back of the circuit board PCB. The transceiver circuit 1250 may be connected to feed structures F1 to F6 of the respective antennas through signal pads formed in a dielectric region on the front of the circuit board PCB. In relation to this, the transceiver circuit 1250 may be controlled to radiate a signal through at least one of the first antenna (LB_ANT1) 1100-1 to fourth antenna (MB_ANT4) 1100-4 and the slot antenna (ANT) 1100S. Here, the transceiver circuit 1250 may be an RFIC (radio frequency integrated chip) that has a power amplifier and a low-noise amplifier.

In relation to this, the baseband processor 1400 may be connected to the transceiver circuit 1250 to control the transceiver circuit 1250. In relation to this, the baseband processor 1400 may be configured to perform MIMO and/or carrier aggregation CA through the first antenna (LB_ANT1) 1100-1 to fourth antenna (MB_ANT4) 1100-4 and the slot antenna (ANT) 1100S.

In the above, the antenna system 1000 mountable on a vehicle according to an aspect of the present disclosure has been described. Now, a vehicle with an antenna system 1000 according to another aspect of the present disclosure will be described. In relation to this, the description of the above antenna system may be applicable to the vehicle, and the description of the vehicle where the antenna system is mounted may be applicable to the above antenna system.

In relation to this, FIG. 3 shows a configuration of a vehicle with an antenna system according to an example of FIGS. 1 to 2C and FIGS. 4 to 13B. Meanwhile, referring to FIGS. 1 to 13B, the vehicle 300 may include an antenna system 1000 constituting at least part of the communication apparatus 400. Also, the vehicle 300 may include an object detecting apparatus and a navigation system, or may include a telematics module TCU that operates in conjunction with them. In relation to this, the telematics module TCU may include other various components apart from the object detecting apparatus, as shown in FIG. 3.

Meanwhile, the antenna system 1000 mounted on a vehicle according to the present disclosure may include a transceiver circuit 1250 which is controlled to radiate a signal through at least one of the first antenna (LB_ANT1) 1100-1 to fourth antenna (MB_ANT4) 1100-4 and the slot antenna (ANT) 1100S. Also, the antenna system mounted on a vehicle according to the present disclosure may further include a baseband processor 1400 which is configured to communicate with at least one of an adjacent vehicle, an RSU (road side unit), and a base station through the transceiver circuit 1250.

Meanwhile, when it is necessary to simultaneously receive information from various entities such as an adjacent vehicle, RSU, or base station for autonomous driving, etc., a broad reception can be allowed through MIMO. Accordingly, the vehicle can receive different information from various entities at the same time to improve a communication capacity. This can improve the communication capacity of the vehicle through the MIMO without a bandwidth extension.

Alternatively, the vehicle may simultaneously receive the same information from various entities, so as to improve reliability for surrounding information and reduce latency. Accordingly, URLLC (Ultra Reliable Low Latency Communication) can be performed in the vehicle and the vehicle can operate as a URLLC UE. To this end, a base station performing scheduling may preferentially allocate a time slot for the vehicle operating as the URLLC UE. For this, some of specific time-frequency resources already allocated to other UEs may be punctured.

Meanwhile, the first and second antennas LB_ANT1 and LB_ANT2 and the slot antenna (ANT) 1100S in the antenna system of the present disclosure may operate as radiators in the low band LB which is a first frequency band. Also, the third and fourth antennas MB_ANT3 and MB_ANT4 may operate as radiators in a second frequency band which is higher than the first frequency band.

Accordingly, the baseband processor 1400 may control the transceiver circuit 1250 to receive a first signal in the first band through at least one of the first and second antennas LB_ANT1 and LBANT2 and the slot antenna (ANT) 1100S, and to receive a second signal in the second band through at least one of the third and fourth antennas MB_ANT3 and MB_ANT4. Thus, the baseband processor 1400 may perform carrier aggregation CA through a combination of the first and second bands.

When it is necessary to receive a large amount of data for autonomous driving and the like, a broadband reception can be allowed through the CA.

Accordingly, eMBB (Enhanced Mobile Broad Band) communication can be performed in the vehicle and the vehicle can operate as an eMBB UE. To this end, a base station performing scheduling may preferentially allocate broadband frequency resources for the vehicle operating as the eMBB UE. For this purpose, CA may be performed on extra frequency bands except for frequency resources already allocated to other UEs.

The broadband antenna system according to the present disclosure may be mounted in the vehicle in the structure illustrated in FIGS. 2A to 2C. That is, the broadband antenna system mounted to the vehicle may be mounted on a roof of the vehicle, inside the roof, or inside a roof frame, as illustrated in FIGS. 2A to 2C.

FIG. 6 is a block diagram illustrating a broadband antenna system and a vehicle in which the antenna system is mounted according to the present disclosure. Referring to FIGS. 4 and 6, a vehicle in which the broadband antenna system is mounted may have the antenna system 1000 mounted thereto. The antenna system 1000 may perform short-range communication, wireless communication, V2X communication, and the like by itself or through the communication apparatus 400. To this end, the baseband processor 1400 may be configured to receive signals from or transmit signals to adjacent vehicles, RSUs, and base stations through the antenna system 1000.

Alternatively, the baseband processor 1400 may be configured to receive signals from or transmit signals to adjacent vehicles, RSUs, and base stations through the communication apparatus 400. Here, the information related to adjacent objects may be acquired through the object detecting apparatus such as the camera 331, the radar 332, the LiDar 333, and the sensors 334 and 335 of the vehicle 300. Alternatively, the baseband processor 1400 may be configured to receive signals from or transmit signals to adjacent vehicles, RSUs, and base stations through the communication apparatus 400 and the antenna system 1000.

In relation to this, referring to FIGS. 1 to 13B, the vehicle 300 with the antenna system 1000 may include a plurality of antennas 1100-1 to 1100-4, a slot antenna (ANT) 1100S, a transceiver circuit 1250, and a baseband processor 1400. The main technical features of the vehicle with the antenna system 1000 according to the present disclosure according to FIGS. 1 to 13B are as follows. In relation to this, all of the technical features related to the above-described antenna system 1000 are applicable to the following description.

The antenna system 1000 mounted on a vehicle includes a first circuit board S1, a second circuit board S2, a feed structure FS, an antenna (ANT) 1100S. In relation to this, the antenna (ANT) 1100S may be a slot antenna formed in a space between the first circuit board S1 and the second circuit board S2, as illustrated in FIG. 7C.

Meanwhile, the first circuit board S1 may be configured to be mountable to a metal frame MF. Also, the second circuit board S2 may be disposed so as to be spaced apart a predetermined distance from the first circuit board S1 through the metal supporters MS1 and MS2. Also, the feed structure FS may be configured in such a way as to connect between the first circuit board S1 and the second circuit board S2. That is, the feed structure FS is configured to feed power to the antenna (ANT) 1100S which is a slot antenna.

Accordingly, the antenna (ANT) 110S which is a slot antenna may be configured in such a way that a signal transmitted from the feed structure FS is radiated through the space between the first circuit board S1 and the second circuit board S2.

Meanwhile, the antenna system 1000 mounted on a vehicle may include a plurality of antennas 1100-1 to 1100-4 disposed in the antenna system 1000, apart from the antenna (ANT) 1100S which is a slot antenna.

Meanwhile, the transceiver circuit 1250 may be controlled to radiate a signal through at least one of the antenna (ANT) 110S and the plurality of antennas 1100-1 to 1100-4. Also, the baseband processor 1400 may be configured to communicate with at least one of an adjacent vehicle, an RSU (road side unit), and a base station through the transceiver circuit 1250.

Meanwhile, the Sub PCB according to the present disclosure may extend to an adjacent area and therefore extend the slot antenna region. Thus, the resonant frequency of the slot antenna may operate in a low band LB as well. In relation to this, FIG. 10A shows a configuration of a second circuit board with an extended PCB according to an embodiment. Meanwhile, FIG. 10B shows a configuration for feeding power to an extended PCB, in an antenna structure with a Sub PCB and the extended PCB.

In relation to this, the second circuit board S2 may include a Sub PCB S2-1 and an extended PCB S2-L and S2-R. Here, the Sub PCB S2-1 may be configured in such a way that an SDARS antenna is disposed thereon. Meanwhile, the extended PCB S2-L and S2-R may be disposed on one side or the other side of the Sub PCB S2, adjacent to the Sub PCB S2. Accordingly, the extended PCB S2-L and S2-R may be configured in such a way as to extend the area where the second circuit board is disposed.

Meanwhile, the metal post of the feed structure FS which is vertically formed between the first circuit board S1 and the second circuit board S2 may be connected directly to the extended PCB S2-L.

Alternatively, referring to FIG. 8B, FIG. 10A, and (b) of FIG. 10B, the metal post of the feed structure FS may be spaced apart from the extended PCB S2-L so as to feed power to it by coupling. In relation to this, the metal post of the feed structure FS may be connected to a feed plate FP which is vertically spaced apart from the extended PCB S2-L of the second circuit board. Meanwhile, the feed plate FP vertically formed between the first circuit board S1 and the second circuit board S2 may be disposed a predetermined distance apart from the extended PCB S2-L. In this case, signals from the feed plate FP may be coupled to the extended PCB S2-L.

Meanwhile, the first circuit board S1 may be disposed so as to be spaced apart a predetermined distance from the metal frame of the vehicle. Meanwhile, a metal plate MP may be disposed on the front of the Sub PCB S2 of the second circuit board. Also, a second metal plate MP2 may be disposed on one side of the Sub PCB S2 of the second circuit board. Also, a feed plate FP connected to a feed post may be disposed on the other side of the Sub PCB S2 of the second circuit board, spaced a predetermined distance apart from the Sub PCB S2.

Meanwhile, the metal plate MP may be configured to be connected to a switching unit SW with a plurality of terminals having different capacitance and inductance values and change the resonant frequency of the antennas. In relation to this, the switching unit SW may include a capacitor having a specific capacitance (C) value, an inductor having a variable inductance value, and first and second switches S1 and S2 respectively connected to them. However, the switching unit SW is not limited to the above configuration, but may include a capacitor having a variable capacitance value, an inductor having a variable inductance value, and first and second switches S1 and S2 respectively connected to them.

In the above, an antenna system mounted on a vehicle and the vehicle where the antenna system is mounted have been described so far. In relation to this, the antenna structure proposed in this disclosure may be applied to an antenna integrated module implemented within a vehicle roof area. Also, the antenna structure proposed in this disclosure has the advantage of using essential structures without limitations on additional structures or spaces, when there is a need to implement an additional antenna apart from other antenna configurations.

Meanwhile, in the related art, in the design of an antenna integrated module, it is necessary to allocate a separate space for each antenna and re-design structures such as patterns required for antenna operation. Meanwhile, the technique proposed in the present disclosure allows for implementing one or more antenna operations without allocating an additional space or designing an additional structure in a module structure that requires a Sub PCB. In relation to this, an antenna with vertical polarization and an antenna with horizontal polarization may be implemented such that a plurality of feed structures are disposed to intersect each other between the Main PCB and the Sub PCB. Alternatively, a ground wall may be disposed between the Main PCB and the Sub PCB, and a plurality of feed structures may be disposed in respective areas separated by a ground wall.

Meanwhile, a slot antenna structure using stacked PCBs proposed in the present disclosure is applicable to every antenna system in which a Main PCB and a Sub PCB are stacked together. In relation to this, in the design of an antenna module, at least one antenna may be provided with an antenna function without an additional structure or space allocation. Accordingly, a slot antenna structure using stacked PCBs proposed in the present disclosure is applicable to other devices other than vehicle antennas.

In the above, an antenna system mounted on a vehicle and the vehicle where the antenna system is mounted have been described so far. A wireless communication system including such an antenna system mounted on a vehicle, the vehicle where the antenna system is mounted, and a base station will be described below. In relation to this, FIG. 14 illustrates a block diagram of a wireless communication system to which methods proposed in the present disclosure are applicable.

Figure 14:
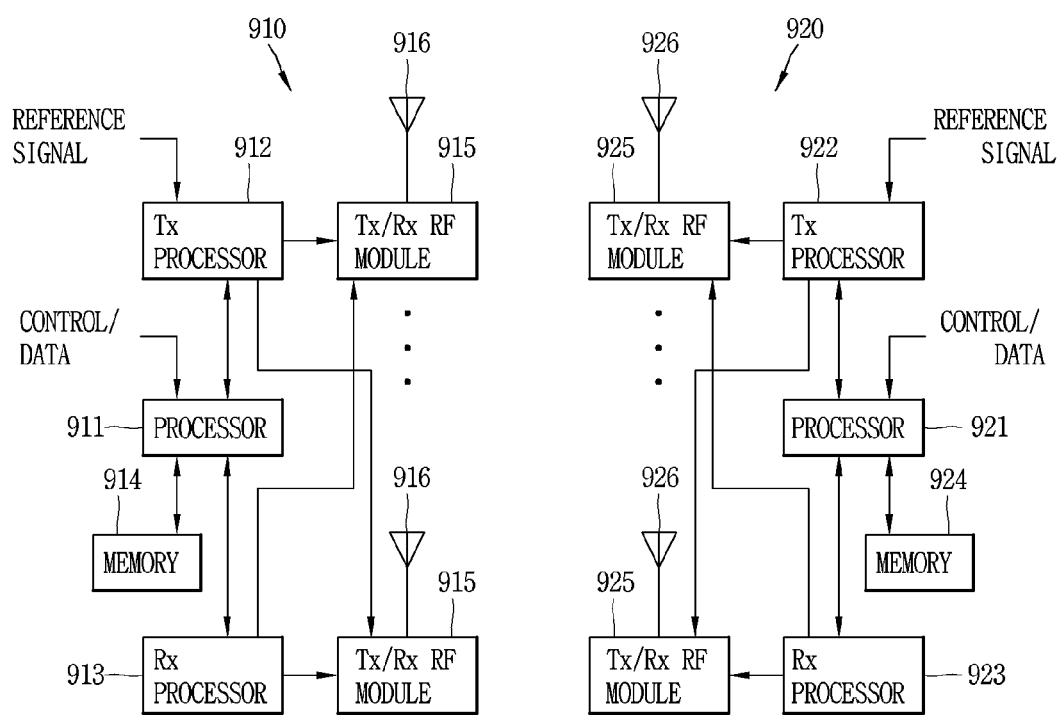
FIG. 14 is an exemplary block diagram of a wireless communication system that is applicable to methods proposed in the present disclosure.

Referring to FIG. 14, the wireless communication system includes a first communication device 910 and/or a second communication device 920. The phrases "A and/or B" and "at least one of A or B" are may be interpreted as the same meaning. The first communication device may be a base station, and the second communication device may be a terminal (or the first communication device may be a terminal, and the second communication device may be a base station).

A base station (BS) may be substituted with a term, such as a fixed station, a Node B, an evolved-NodeB (eNB), a next generation NodeB (gNB), a base transceiver system (BTS), an access point (AP), a general NB (gNB), a 5G system, a network, an AI system, a road side unit (RSU), or a robot. Furthermore, a terminal may be fixed or have mobility, and may be substituted with a term, such as a user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, a vehicle, a robot, or an AI module.

The first communication device and the second communication device include processors 911 and 921, memories 914 and 924, one or more Tx/Rx radio frequency (RF) modules 915 and 925, Tx processors 912 and 922, Rx processors 913 and 923, and antennas 916 and 926. The processor implements the functions, processes, and/or methods that have been described above. More specifically, a higher layer packet from a core network is provided to the processor 911 in DL (communication from the first communication device to the second communication device). The processor implements a function of an L2 layer. In the DL, the processor provides multiplexing between a logical channel and a transmission channel and allocation of radio resources to the second communication device 920 and takes charge of signaling to the second communication device. The transmit (TX) processor 912 implement various signal processing functions for an L1 layer (i.e., physical layer). The signal processing functions facilitate forward error correction (FEC) at the second communication device and include coding and interleaving. Encoded and modulated symbols are divided into parallel streams, each stream is mapped to an OFDM subcarrier, multiplexed with a reference signal (RS) in a time and/or frequency domain, and combined together by using inverse fast Fourier transform (IFFT) to create a physical channel carrying a time domain OFDMA symbol stream. An OFDM stream is spatially precoded in order to create multiple spatial streams. Respective spatial streams may be provided to different antennas 916 via individual Tx/Rx modules (or transceivers, 915). Each Tx/Rx module may modulate an RF carrier into each spatial stream for transmission. In the second communication device, each Tx/Rx module (or transceiver, 925) receives a signal through each antenna 926 of each Tx/Rx module. Each Tx/Rx module reconstructs information modulated with the RF carrier and provides the reconstructed information to the receive (RX) processor 923. The RX processor implements various signal processing functions of layer 1. The RX processor may perform spatial processing on information in order to reconstruct an arbitrary spatial stream which is directed for the second communication device. When multiple spatial streams are directed to the second communication device, the multiple spatial streams may be combined into a single OFDMA symbol stream by multiple RX processors. The RX processor transforms the OFDMA symbol stream from the time domain to the frequency domain by using fast Fourier transform (FFT). A frequency domain signal includes individual OFDMA symbol streams for respective subcarriers of the OFDM signal. Symbols on the respective subcarriers and the reference signal are reconstructed and demodulated by determining most likely signal arrangement points transmitted by the first communication device. The soft decisions may be based on channel estimation values. The soft decisions are decoded and deinterleaved to reconstruct data and control signals originally transmitted by the first communication device on the physical channel. The corresponding data and control signals are provided to the processor 921.

UL (communication from the second communication device to the first communication device) is processed by the first communication device 910 in a scheme similar to a description of a receiver function in the second communication device 920. Each Tx/Rx module 925 receives the signal through each antenna 926. Each Tx/Rx module provides the RF carrier and information to the RX processor 923. The processor 921 may be associated with the memory 924 storing a program code and data. The memory may be referred to as a computer readable medium.

Technical advantages of such an antenna system mounted on a vehicle and the vehicle where the antenna system is mounted are as follows.

According to the present disclosure, it is possible to arrange antennas with a low-profile structure through a slot antenna formed in a space between stacked PCBs in the antenna system mounted on the vehicle.

Another advantage of the antenna system mounted on a vehicle according to the present disclosure is that radiation efficiency can be increased while a low-band (LB) antenna is operating in a wide band.

A further advantage of the antenna system mounted on a vehicle according to the present disclosure is that the level of interference between different antennas can be reduced.

According to an implementation, a structure for mounting an antenna system, which can operate in a broad band, in a vehicle can be provided to support various communication systems by implementing a low band (LB) antenna and other antennas in one antenna module.

According to an implementation, the antenna system can be optimized with different antennas in the low band LB and other bands. This can result in arranging the antenna system with optimal configuration and performance in a roof frame of the vehicle.

According to the present disclosure, the antenna system of the vehicle can implement MIMO and diversity operations using a plurality of antennas in specific bands.

Further scope of applicability of the present invention will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

In relation to the aforementioned present disclosure, design and operations of a plurality of antennas of an antenna system mounted in a vehicle and a configuration performing the control of those antennas can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller of the terminal. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

The invention claimed is:

1. An antenna system mounted on a vehicle comprising:
a first circuit board configured to be mountable to a metal frame;
a second circuit board disposed so as to be spaced apart a predetermined distance from the first circuit board through metal supporters;
a feed structure configured to connect between the first circuit board and the second circuit board; and
an antenna configured to radiate a signal transmitted from a feed structure, the signal being transmitted through a space between the first circuit board and the second circuit board,
wherein the feed structure comprises:
a first signal pad and a second signal pad spaced a predetermined distance apart from each other in an area on the first circuit board from which a ground area is removed; and
a metal post connected to at least one of the first signal pad and the second signal pad and vertically formed between the first circuit board and the second circuit board.

2. The antenna system of claim 1, wherein the second circuit board comprises:
a Sub printed circuit board (PCB) where a Satellite Digital Audio Radio Services (SDARS) antenna is disposed; and
an extended PCB disposed on one side or the other side of the Sub PCB, adjacent to the Sub PCB and configured in such a way as to extend the area where the second circuit board is disposed.

3. The antenna system of claim 2, wherein the metal post of the feed structure vertically formed between the first circuit board and the second circuit board is connected directly to the extended PCB or spaced apart from the extended PCB so as to feed power to the same by coupling.

4. The antenna system of claim 2, wherein the metal post of the feed structure is connected to a feed plate which is vertically spaced apart from the second circuit board, the feed plate vertically formed between the first circuit board and the second circuit board is disposed a predetermined distance apart from the extended PCB, and signals from the feed plate are coupled to the extended PCB.

5. The antenna system of claim 4, wherein signals from the metal post are radiated through regions corresponding to the feed structure, the extended PCB, the Sub PCB, the metal supporters, and the first PCB,
wherein the antenna resonates at a first frequency through a first region formed by one of the metal supporters and resonates at a second frequency through a second region formed by the other metal supporter.

6. The antenna system of claim 2, wherein the first circuit board is disposed so as to be spaced apart a predetermined distance from the metal frame, and a metal plate is disposed on the front of the Sub PCB of the second circuit board.

7. The antenna system of claim 2, wherein a second metal plate is disposed on one side of the Sub PCB of the second circuit board, and a feed plate connected to a feed post is disposed on the other side of the Sub PCB of the second circuit board, spaced a predetermined distance apart from the Sub PCB, wherein the metal plate is configured in such a way as to be connected to a switching unit with a plurality of terminals having different capacitance and inductance values and change the resonant frequency of the antenna.

8. The antenna system of claim 1, further comprising a transceiver circuit configured to transmit signals to the antenna through the feed structure,
wherein the transceiver circuit is disposed on the back of the first circuit board.

9. The antenna system of claim 8, wherein the first circuit board is configured such that a plurality of antennas are disposed thereon, and
wherein the antenna system further comprises:
a first antenna configured to be connected to the first circuit board through a first feed structure, so as to radiate a first signal through a first metal pattern printed on a first dielectric structure and a first slot;
a second antenna configured to be connected to the first circuit board through a second feed structure, so as to radiate a second signal through a second metal pattern printed on a second dielectric structure and a second slot; and
a transceiver circuit that is controlled to radiate a signal through at least one of the antenna, the first antenna, and the second antenna.

10. The antenna system of claim 9, wherein the first antenna operates in a first band corresponding to a low band (LB) and comprises a first portion and a second portion so as to be connected to one side and one edge of the circuit board, and the second antenna operates in the first band corresponding to the low band LB and comprises a first portion and a second portion so as to be connected to the other side and one edge of the circuit board.

11. The antenna system of claim 9, further comprising a baseband processor that is operably coupled to the transceiver circuit and configured to control the transceiver circuit so as to perform multiple-input/multi-output (MIMO) in the first band corresponding to the low band through a plurality of antennas,
wherein the plurality of antennas are low-band (LB) antennas comprising the antenna, the first antenna, and the second antenna.

12. The antenna system of claim 11, wherein, based on the quality of the first signal received through the first antenna being lower than a threshold, the baseband processor performs MIMO through the antenna and the second antenna, and based on the quality of the second signal received through the second antenna being lower than a threshold, the baseband processor performs MIMO through the antenna and the first antenna.

13. The antenna system of claim 11, wherein carrier aggregation (CA) is performed through the first signal or second signal in the first band received through the first antenna or the second antenna and the third signal in the second band received through the third antenna, and based on the quality of the first signal or the second signal being lower than a threshold, the CA is performed through a signal in the first band received through the antenna and the third signal.

14. The antenna system of claim 9, further comprising a third antenna configured to be connected to the circuit board through a third feed structure, so as to radiate a third signal through a third metal pattern printed on a third dielectric structure and a third slot which are disposed on one edge of the circuit board; and
a fourth antenna configured to be connected to the circuit board through a fourth feed structure, so as to radiate a fourth signal through a fourth metal pattern printed on a fourth dielectric structure and a fourth slot which are disposed on another edge of the circuit board.

15. A vehicle having an antenna system, the vehicle comprising:
a first circuit board configured to be mountable to a metal frame;
a second circuit board disposed so as to be spaced apart a predetermined distance from the first circuit board through metal supporters;
a feed structure configured to connect between the first circuit board and the second circuit board;
an antenna configured to radiate a signal transmitted from a feed structure, the signal being transmitted through a space between the first circuit board and the second circuit board,
a plurality of antennas disposed on the antenna system, apart from the antenna;
a transceiver circuit that is controlled to radiate a signal through at least one of the antenna and the plurality of antennas; and
a baseband processor configured to communicate with at least one of an adjacent vehicle, an RSU (road side unit), and a base station through the transceiver circuit.

16. The vehicle of claim 15, wherein the second circuit board comprises:
a Sub printed circuit board (PCB) where a Satellite Digital Audio Radio Services (SDARS) antenna is disposed; and
an extended PCB disposed on one side or the other side of the Sub PCB, adjacent to the Sub PCB and configured in such a way as to extend the area where the second circuit board is disposed.

17. The vehicle of claim 16, wherein the metal post of the feed structure vertically formed between the first circuit board and the second circuit board is connected directly to the extended PCB or spaced apart from the extended PCB so as to feed power to the same by coupling.

18. The vehicle of claim 16, wherein the metal post of the feed structure is connected to a feed plate which is vertically spaced apart from the second circuit board, the feed plate vertically formed between the first circuit board and the second circuit board is disposed a predetermined distance apart from the extended PCB, and signals from the feed plate are coupled to the extended PCB.

19. The vehicle of claim 16, wherein the first circuit board is disposed so as to be spaced apart a predetermined distance from the metal frame, and a metal plate is disposed on the front of the Sub PCB of the second circuit board,
wherein the metal plate is configured in such a way as to be connected to a switching unit with a plurality of terminals having different capacitance and inductance values and change the resonant frequency of the antenna.

* * * * *